United States Patent [19]
Bornhorst et al.

[11] 3,766,560
[45] Oct. 16, 1973

[54] RADIO RECEIVING APPARATUS FOR LOCATING A PLURALITY OF TARGET TRANSMITTERS

[75] Inventors: Kenneth F. Bornhorst, Dayton; Jack L. Monroe, Tipp City; Alvin E. Culbertson, Dayton, all of Ohio; David E. Thomas, Columbia, S.C.; Donald E. Drake, Tipp City, Ohio

[73] Assignee: The National Cash Register Company, Dayton, Ohio

[22] Filed: Feb. 11, 1972

[21] Appl. No.: 225,519

[52] U.S. Cl. ............................ 343/118, 343/112 PT
[51] Int. Cl. ............................................... G01s 3/58
[58] Field of Search ...................................... 343/118

[56] References Cited
UNITED STATES PATENTS 3,150,364  9/1964  Green ............................ 343/118 X
3,305,787  2/1967  Distler et al. .................... 343/118 X
3,449,749  6/1969  McEvoy ......................... 343/118 X Primary Examiner—Benjamin A. Borchelt
Assistant Examiner—Richard E. Berger
Attorney—J. T. Cavender et al.

[57] ABSTRACT

Apparatus combining a UHF radio receiver with digital circuitry for processing and displaying signals indicating the location of one or more remotely located target radio transmitters, which apparatus includes a signal storing bearing indicator device operated in synchronism with a continuously rotating receiver antenna, and which apparatus also includes a refined AGC system and a target verifying correlation system for improving reliability of the information presented to an operator.

13 Claims, 14 Drawing Figures

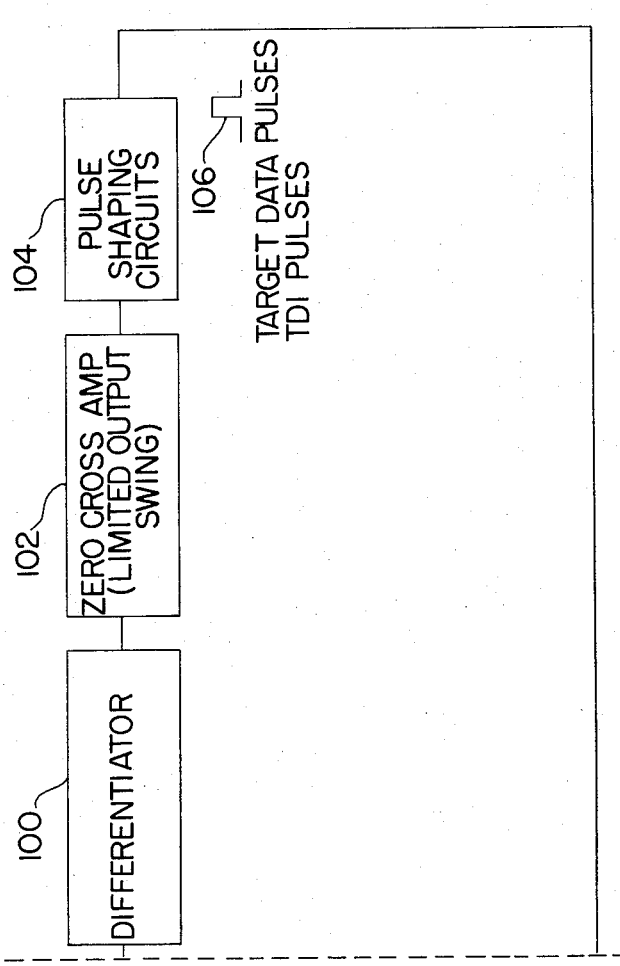

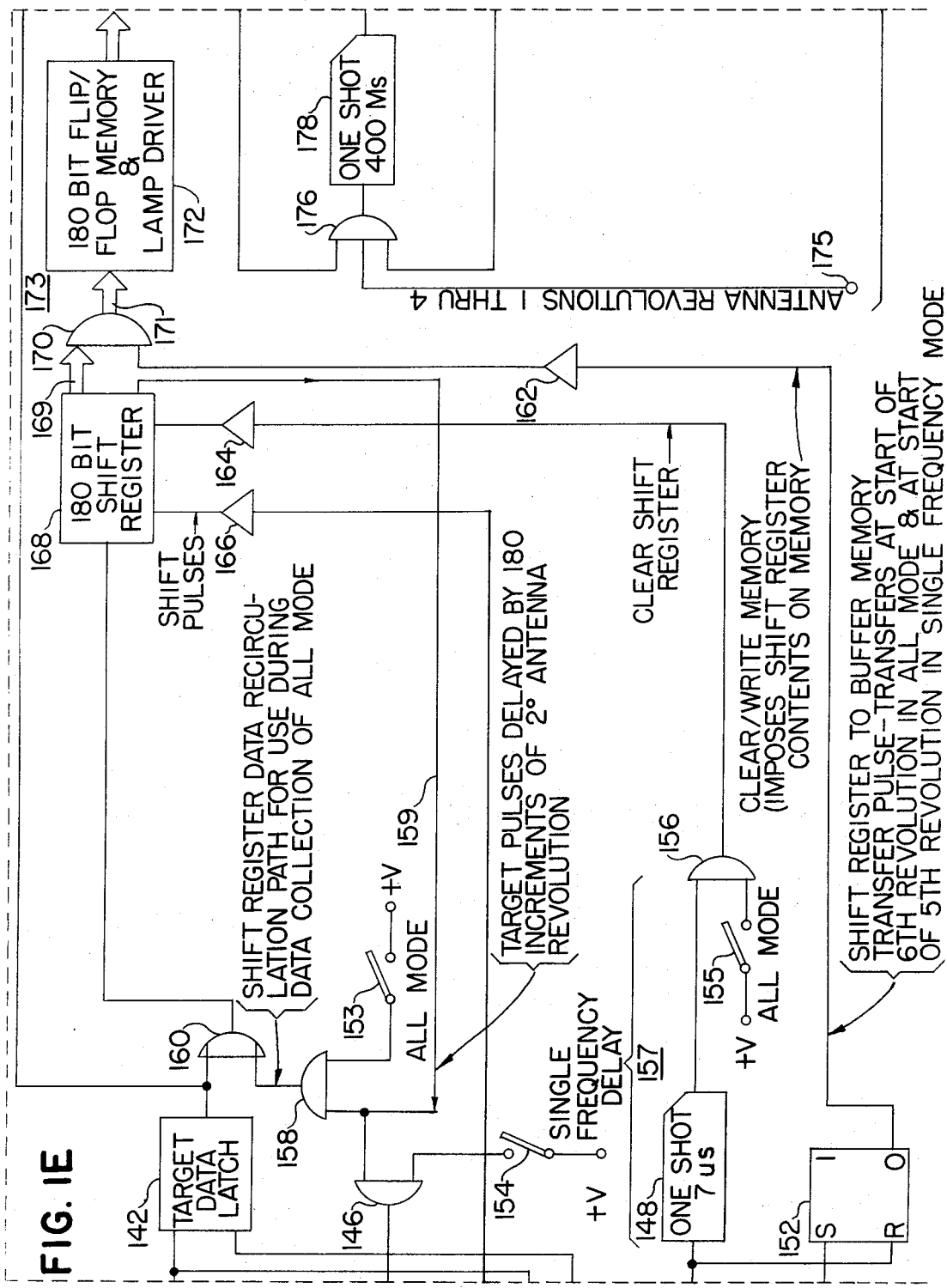

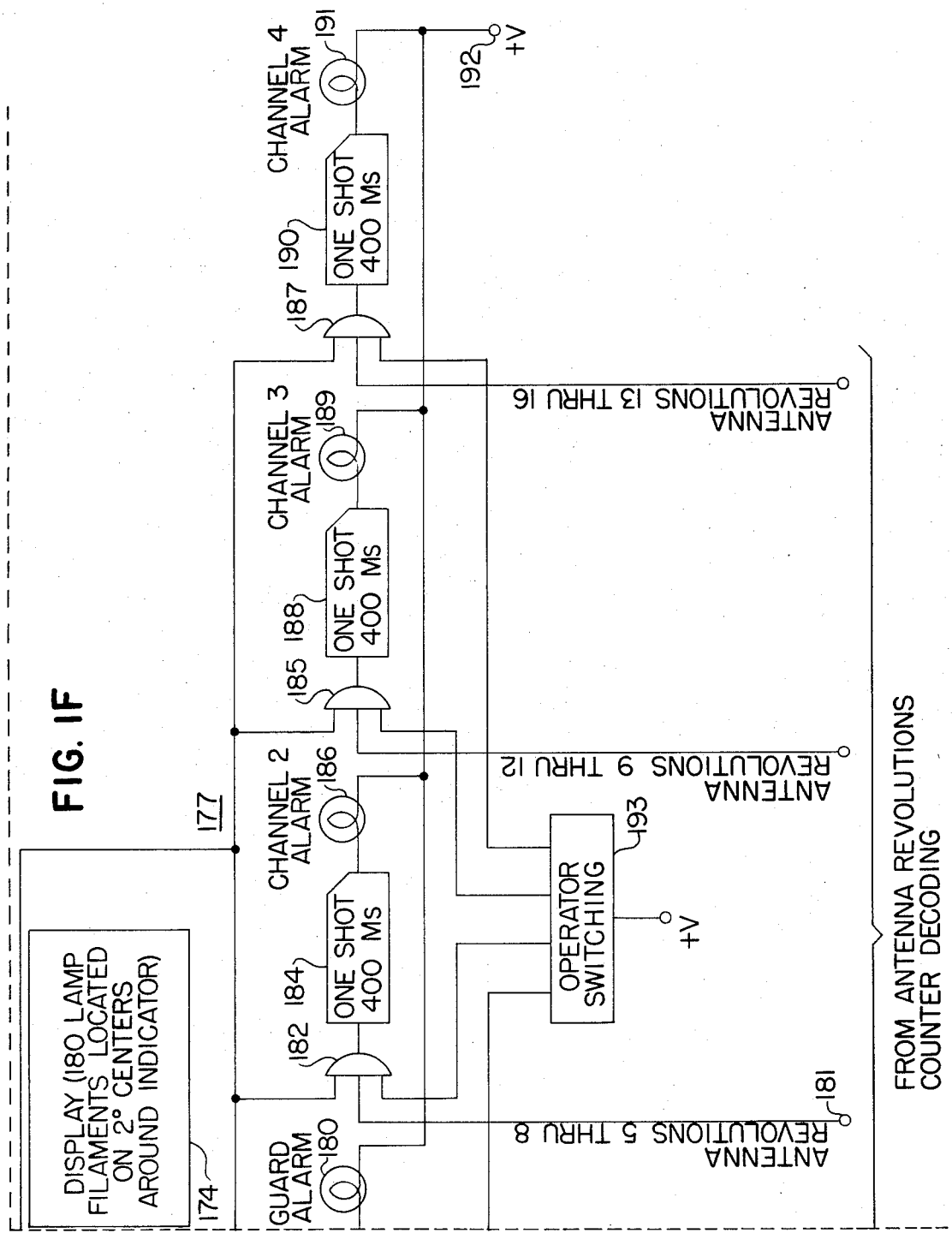

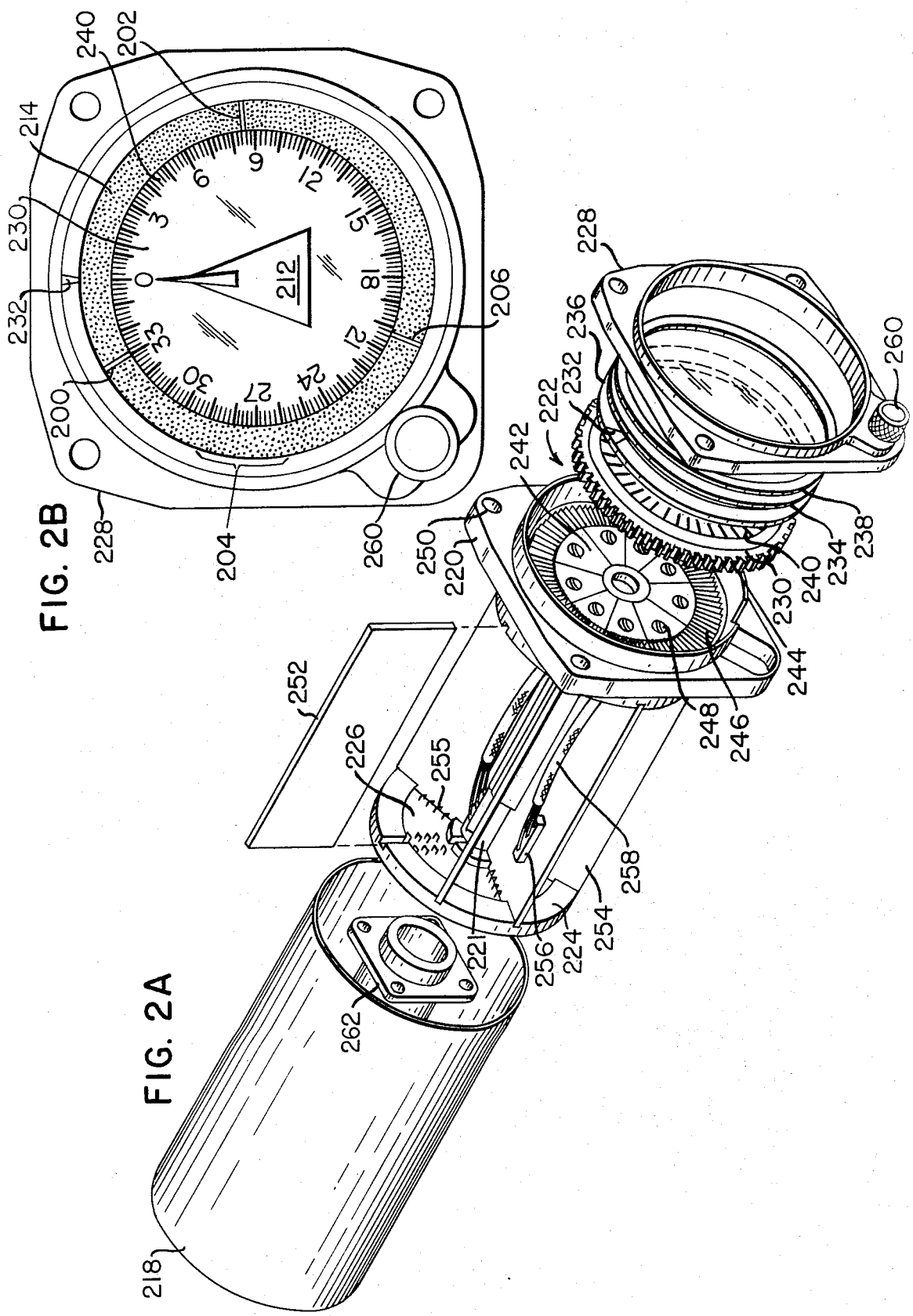

NOTE
∗ = STRAIGHT LINE DISTANCES BETWEEN INDICATED COMPONENTS.
OTHER DIMENSIONS ARE COAXIAL CABLE LENGTHS.

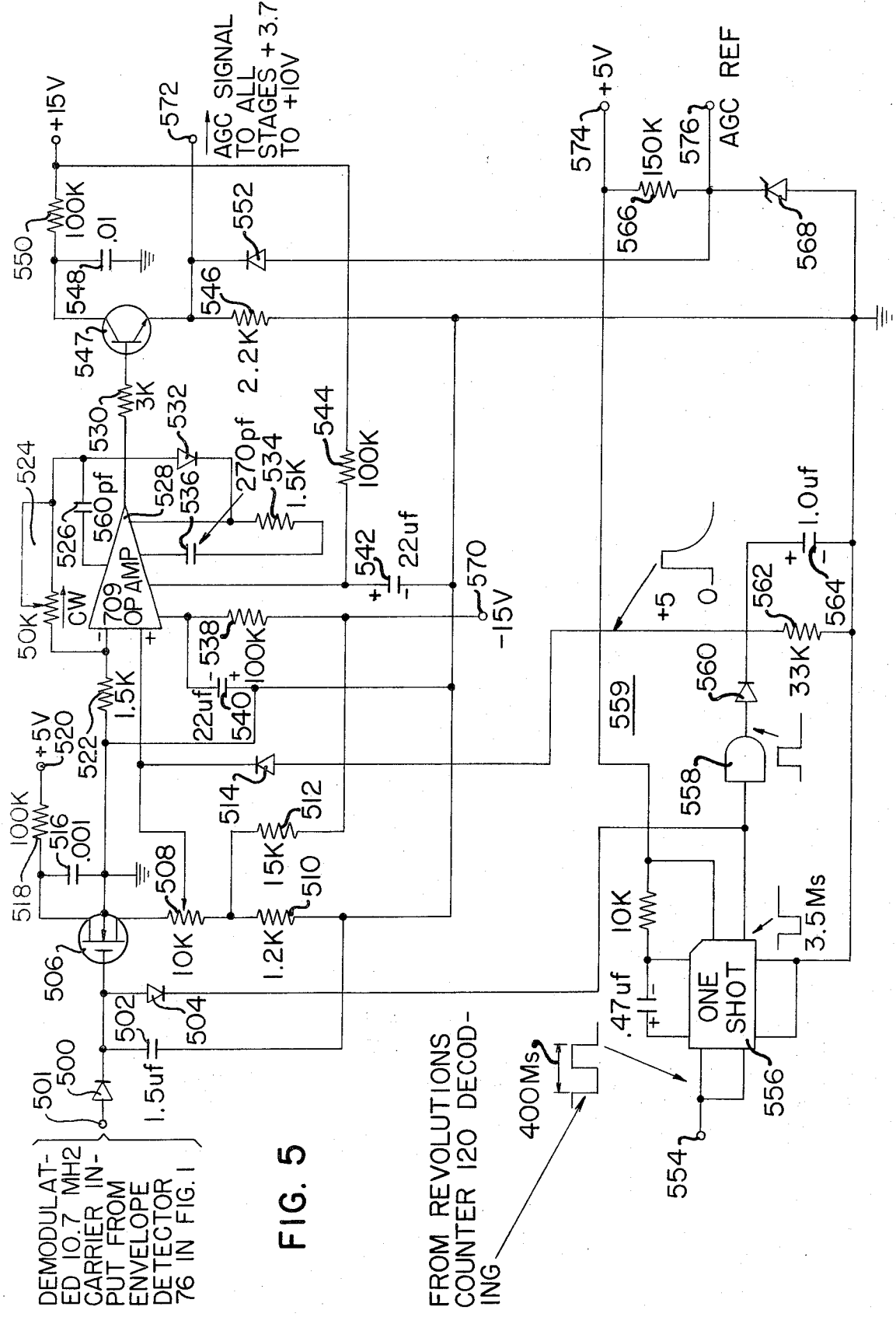

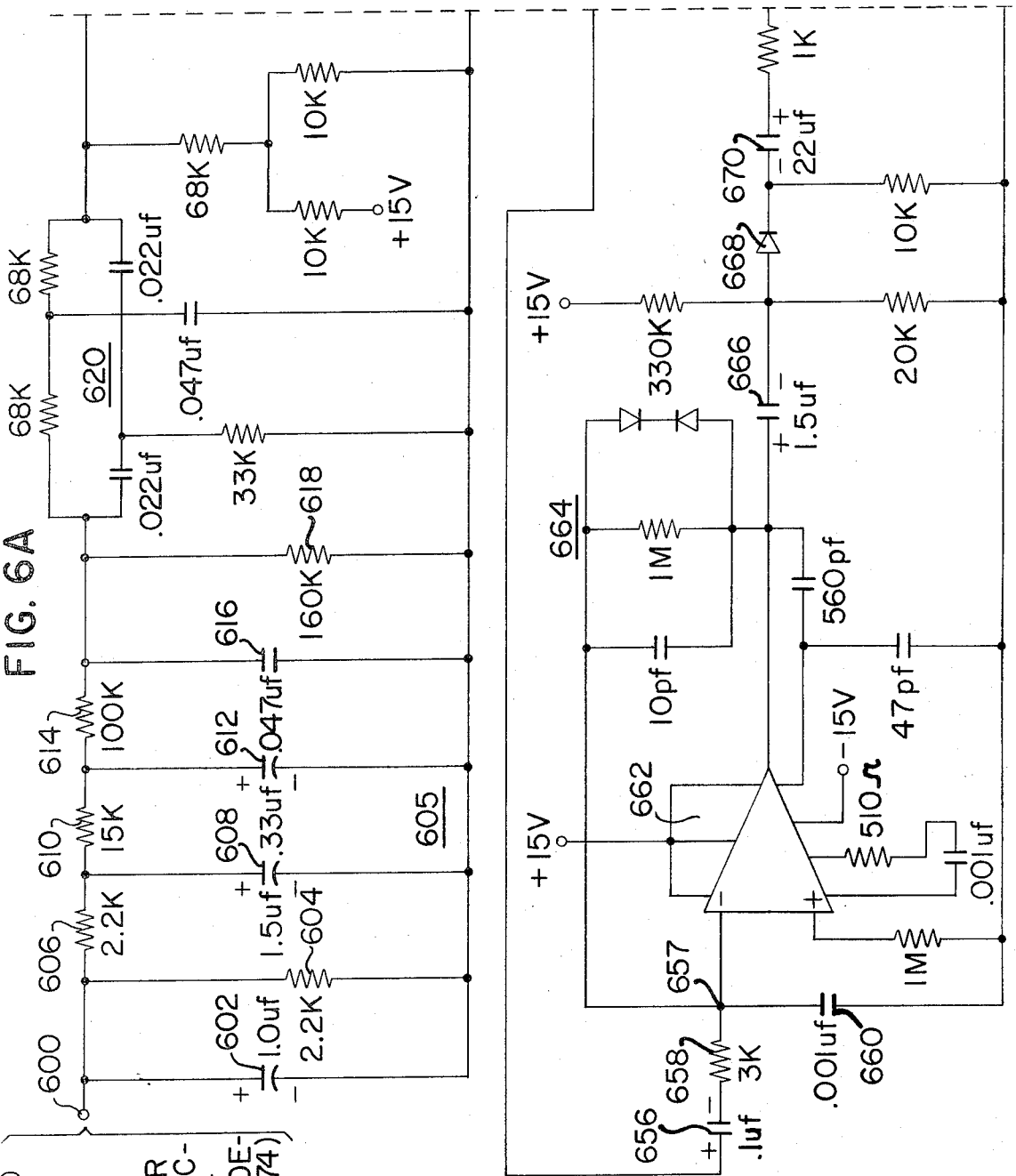

RADIO RECEIVING APPARATUS FOR LOCATING A PLURALITY OF TARGET TRANSMITTERS

BACKGROUND OF THE INVENTION

1. Field of the Invention

The invention herein described was made in the course of or under a contract or a subcontract thereunder with the U.S. Air Force, Contract Number F33657-67-C-1083-P001, and pertains to an improved radio frequency homing receiver capable of processing signals from a plurality of targets and of displaying reliable indications of such targets to an operator in a concise and easily usable manner.

2. Description of the Prior Art

Prior art radio frequency receiving apparatus of the direction finding and homing type is primarily concerned with processing signals received from a single target transmitter together with providing an indication of the target to receiver distance, with much of such prior art apparatus accomplishing homing by the use of signal null detection. The present invention overcomes the single target limitations and the null signal detection limitation while also providing improvements in the receiver AGC and target verifying systems.

BRIEF SUMMARY OF THE INVENTION

The invention contemplates radio frequency receiver apparatus combining in several arrangements the functions of multiple target processing and display, signal peak detection, stable, electrically-controlled tuning, target verification through correlation, multiple AGC circuits for enhancing the target indicating and information communicating capability of a received signal and signal filtering for discriminating between expected target signals and noise signals.

The invention also contemplates a digital data displaying device for maintaining long duration displays of plural information bits in a small easily discerned manner and for providing previously received signals for correlation with later received signals.

The invention also contemplates multiple automatic gain control (AGC) circuits for developing both a long term gated AGC signal and a fast reacting AGC signal.

BRIEF DESCRIPTION OF DRAWINGS

FIGS. 1A, 1B, 1C, 1D, 1E and 1F of the drawings, hereinafter referred to generally as FIG. 1 when combined in the manner as shown in FIG. 7, show a block diagram of a radio frequency homing receiver system made in accordance with the present invention;

FIGS. 2A and 2B show an exploded perspective view and a front view, respectively, of a bearing indicator which may be used with the system of FIG. 1;

FIG. 5 shows an electrical schematic diagram of an automatic gain control circuit used in the system of FIG. 1;

FIGS. 6A and 6B combine to show an electrical schematic diagram of an automatic gain control system usable in the system of FIG. 1; and FIG. 7 of the drawings, located on the sheet containing FIG. 1C, illustrates the manner in which FIGS. 1A-1F fit together to form the FIG. 1 system.

DESCRIPTION OF THE PREFERRED EMBODIMENT

The following description relates to radio frequency receiving apparatus adapted to receiving signals from UHF emergency beacon transmitters commonly used by aircraft pilots as an aid to rescue and evacuation in hostile terrain, which apparatus is especially suitable for mounting in a helicopter or other small rescue aircraft.

Although the apparatus may be called an automatic direction finding system (ADF System), it may also be called a homing apparatus since it provides guidance of a rescue vehicle toward one of a plurality of target transmitters located at arbitrary and unknown geographic points; this function being in contrast to the normal ADF function, wherein receiving apparatus is used in navigation between points of known geographic coordinates and wheren the ADF receiver provides only single signal processing capability. The presently described apparatus provides processing and displaying capability for up to 24 different target transmitters on a total of four reception frequencies. Also, such apparatus is capable of extracting both bearing data and audio frequency modulation data from the signal received from a target transmitter, the audio information being either human voice modulation or tone modulation.

The apparatus described utilizes continuous constant velocity rotation of a directional antenna in contrast with the familiar Adcock ADF system which employs a stationary but movable array of directive antennas. The apparatus described also differs from the Adcock apparatus in its sensing of the peak or maximum amplitude point of a received target signal in lieu of sensing the null or point of minimum signal reception. This ability of the system to operate with a high average signal rather than a null signal has important implications where it is desired to receive voice or other intelligence information from the target transmitter in addition to the location indicating signal, and constitutes an important improvement over the Adcock and other ADF systems which obligate the receiver to constantly operate with a minimum of received signals from the target transmitter for the most accurate guidance.

Figure 1A:
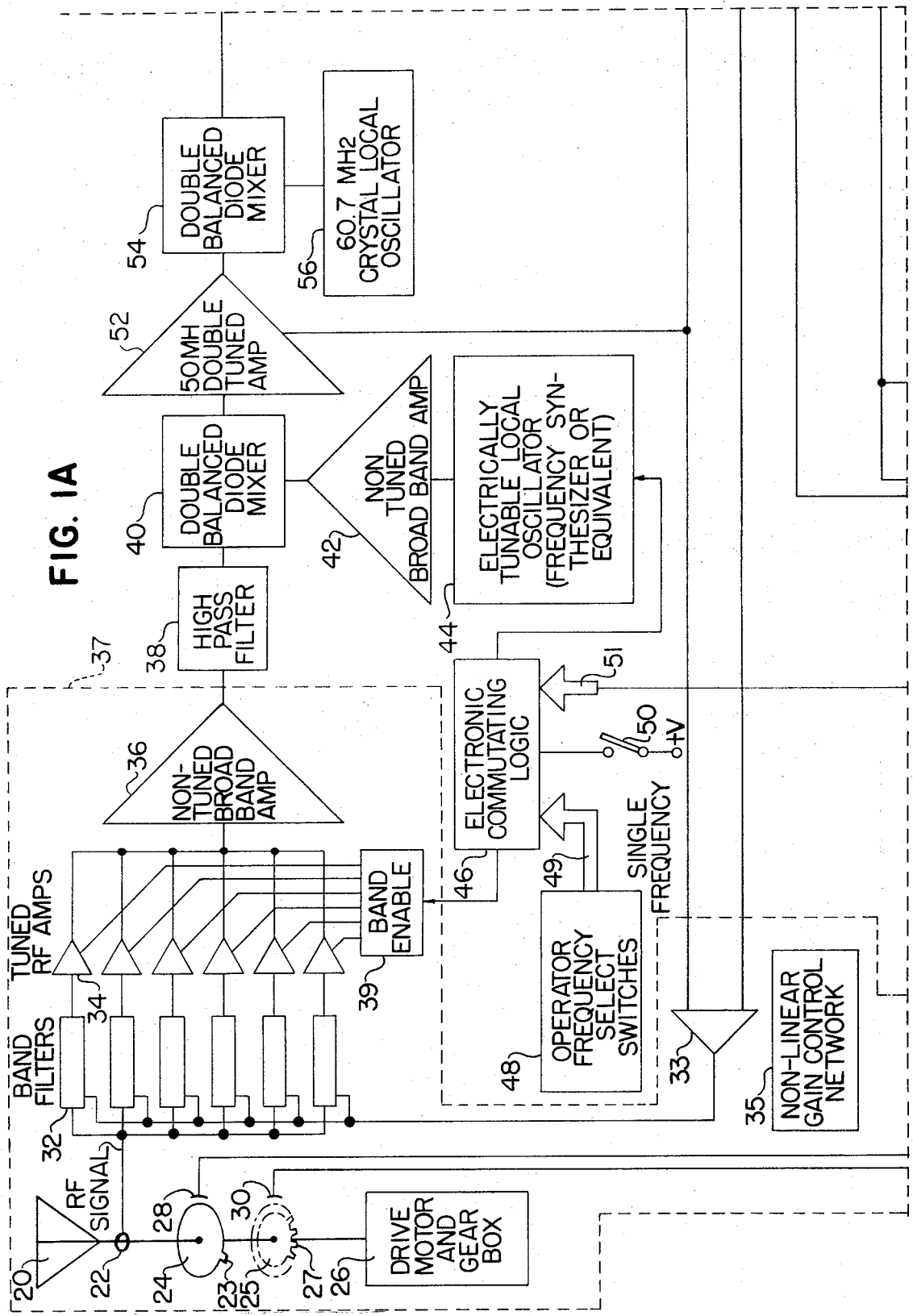
Figure 1B:
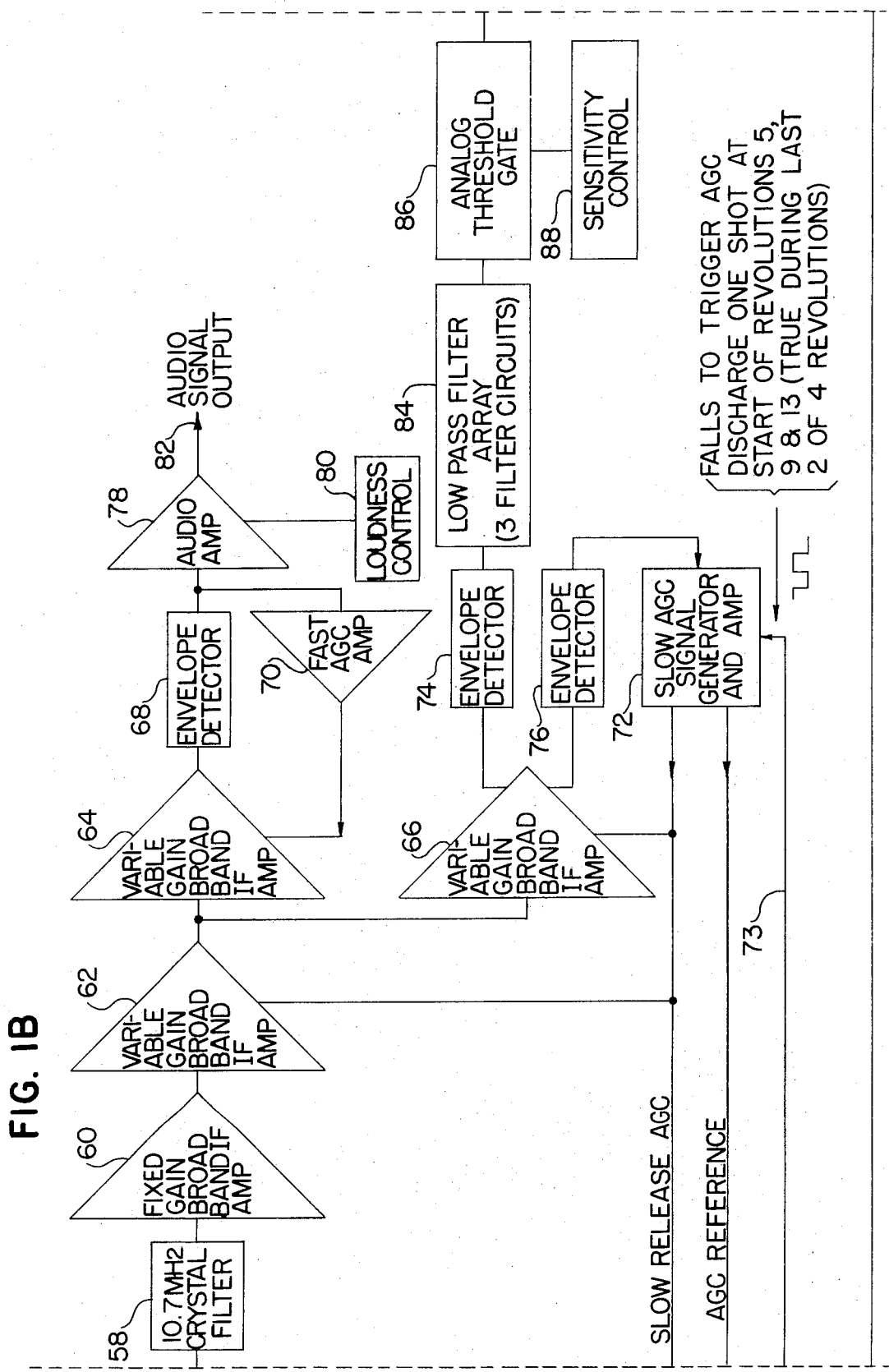
Figure 1D:
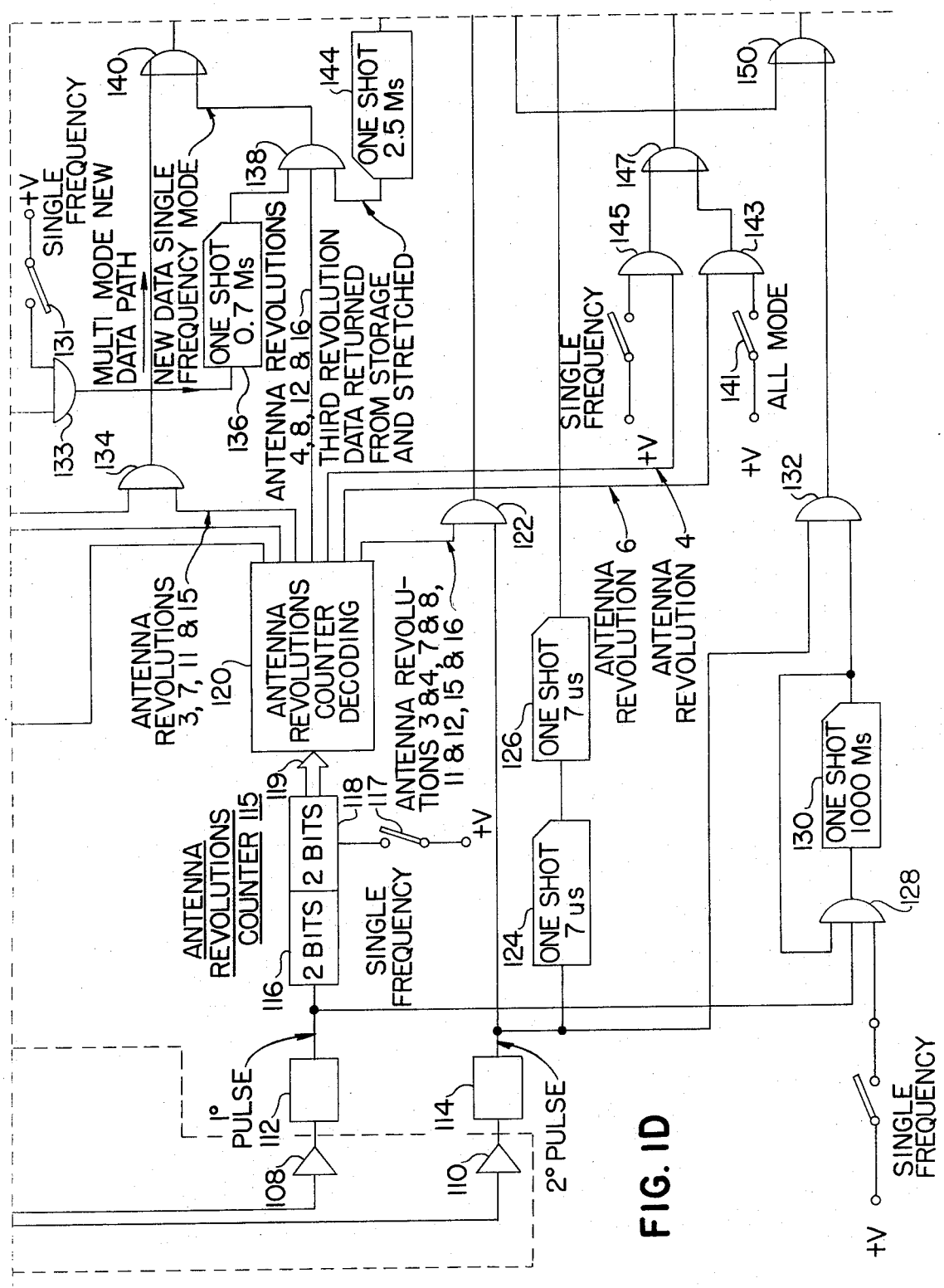

The receiver system of the FIG. 1 makeup of the drawings consists of a radio frequency signal handling section which commences with antenna 20 (FIG. 1A) and passes radio frequency signals along a path which includes the double conversion superheterodyne circuitry involving mixer circuits 40 and 54, intermediate frequency amplifiers 60, 62, 64 and 66 (FIG. 1B) and terminates with an audio signal terminal 82 and a pulse signal output, pulse 106 (FIG. 1C). The ADF receiver also includes digital logic circuitry as shown in the bottom portion (FIGS. 1D, 1E and 1F) of FIG. 1 for correlating pulse signals 106 with the rotational position of antenna 20 and displaying the results of this correlation to an operator in a visual pattern.

The receiver of the preferred embodiment is intended for operation in the ultra high frequency band between the frequencies of 200 and 400 MHz with a highly directive physically rotating antenna array. The frequency of operation is not critical to the nature of the invention described herein since other apparatus within the scope of the invention could be designed to operate in any radio frequency band. The 200 to 400

MHz frequency band selected for the preferred embodiment is assigned by international agreement for military, governmental and emergency uses. The receiver apparatus of FIG. 1 divides the 200 to 400 MHz frequency range into six discrete intervals each covering a frequency span of 30 to 50 MHz, the span of 30 to 50 MHz being conveniently covered by a tuned circuit network having the desired selectivity or the desired Q. The tuned circuit for each of these intervals is selected by digital control signals in the receiver.

The ADF receiver apparatus of FIG. 1 also provides for automatic switching between four selected reception frequencies with the four selected frequencies being selectable at will to a resolution of 50 KHz by electrical tuning switches accessible to the operator.

Although apparatus similar to that shown in FIG. 1 of the drawings could be fabricated to employ almost any band of radio frequencies from the low frequency band up to and including the microwave frequency band, the indicated 200 to 400 MHz range in the ultra high frequency (UHF) band offers the convenience of line of sight transmission, physically small and mechanically rotatable antennas, good antenna directional characteristics, and convenient light-weight small size portable transmitting apparatus that is easily adapted to the pilot rescue environment. If the apparatus of FIG. 1 were employed at low frequencies an array of ferrite core antennas could be substituted for the physically rotating antenna shown in FIG. 1. At higher frequencies a rotating waveguide horn or electronically scanned stationary antenna could be employed with the FIG. 1 apparatus.

The circuitry shown in FIG. 1 is descriptive of signal flow between processing portions of the ADF system, and while there is omitted such formalities as the receiver power supply, division of the system into mounting space dictated packages, and the actual wiring connections between signal processing circuits, it is believed that persons skilled in the art of ADF receiver design can provide these formal details from the prior art without difficulty.

In its simplest form, operation of the circuitry shown in FIG. 1 consists of generating in the radio frequency circuitry of the receiver an electrical pulse indicating the reception of signal from a remote transmitter, this electrical pulse being the target data pulse 106 shown in FIG. 1. Once this pulse has been generated, the remaining portion of the FIG. 1 circuitry is used to relate the time occurrence of the target data pulse 106 to the antenna rotation position and to display this relation in a manner easily comprehended by an aircraft pilot. The relation of target data pulses to antenna position is achieved by loading target data pulses into a 180 bit shift register which shifts data pulses between bit positions each time the antenna rotation position has changed by 2°, that is, rotation of the directional antenna is divided into 180 increments of 2° each with the target information located in each 2° rotation increment being resolved by the system and displayed to the operator. In its simplest form, the ADF system of FIG. 1 consists of a serial digital memory clocked in synchronism with rotation of the directional antenna array, a radio frequency receiver circuit, and an operator display apparatus.

The system of FIG. 1 also provides several capabilities which increase its overall usefulness, including electrical tuning of the receiver by either manual or sequential automatic control, double conversion superheterodyne radio frequency circuitry for better image signal rejection, provision for extracting an audio frequency signal in addition to a target data pulse from the received radio frequency signal, an elaborate automatic gain control network permitting operation over a wide range of signal strengths, a signal peak detecting circuit cooperative with the directive antenna array in order that target signals may be detected by their maximum received signal in lieu of the conventional minimal or null signal detection, a digital signal correlation apparatus for assuring the validity of displayed target indications, and a system of operator alerting lamps for indicating the presence of received but not displayed signal. The FIG. 1 system also includes special electrical filtering to remove the effects of aircraft propeller modulation and other interference from the received radio frequency signal.

Several portions of FIG. 1, including the directional antenna array 20, the operator display apparatus 173, the AGC system 72, and the low pass filter 84 are described in detail following the overall system description of the FIG. 1 apparatus. Considering such FIG. 1 apparatus, it is sufficient to note that the antenna 20 is a directive array of elements having approximately a 60° beam width, and is physically rotated by a drive rotor and gear box 26 to scan in all possible azimuth directions around the receiving apparatus.

As shown (FIG. 1A), digital signals indicating rotational position of the antenna 20 are generated by magnetic pickup heads 28 and 30 which engage rotating gears 24 and 25 mounted on an antenna shaft driven by the motor gear box combination 26. The signals generated by the magnetic pickup head 28 occur once for each rotation of the antenna 20 at approximately the 1° displacement position of the antenna while signals generated by the magnetic pickup head 30 occur every 2° of antenna rotation with the 1° pulse occurring substantially one-half way between the 0° and 2° pulses.

Radio frequency electrical signals representing the propagated waves received by antenna 20 are coupled through a rotating electrical coupling 22 into the receiving apparatus. The radio frequency signals are first applied to an RF pre-amplifier assembly which is located in the package 37 containing the antenna 20, the motor and gear box unit 26; signal transmission between the RF pre-amplifier assembly and the rotating electrical coupling 22 being accomplished with coaxial cable at some low impedance level such as 50 ohms. The radio frequency portion of the receiver apparatus of FIG. 1 consists of the RF pre-amplifier assembly, a high pass filter network 38, two double balanced diode mixers 40 and 54, an electrically tunable local oscillator 44, a crystal controlled load oscillator 56, a first intermediate frequency amplifier 52 located between the two mixer stages (all as shown in FIG. 1A), a crystal filter circuit 58, and broad band intermediate frequency amplifiers 60, 62, 64 and 66 which are connected to detector circuits 68, 74, 76, respectively, to provide audio and pulse output signals (FIG. 1B). The gain of several amplifier stages in the radio frequency portion of the receiver is controlled by a slow AGC signal generator 72, while gain of the audio frequency intermediate amplifier is controlled by a fast AGC amplifier 70.

During operation of the radio frequency portion of the FIG. 1 system, the RF signal is coupled through the rotating electrical coupling 22 from the antenna 20 to one of the six band filters 32 and a corresponding tuned RF amplifier 34 before passing through the broad band amplifier 36 into the high pass filter 38. Such RF signal from the broad band amplifier 36 is coupled by a low impedance coaxial cable into the high pass filter 38. The AGC signals feeding amplifier 33 in the RF pre-amplifier assembly are supplied in differential form as on AGC and AGC reference signals in order to minimize the amount of power supply and other noise impressed on the AGC signal applied to the tuned RF amplifiers. The use of a differential amplifier at 33 has been found to provide common mode noise signal rejection in the order of 30 db in the 400 Hz frequency band used for aircraft power supply. The non-linear gain control network 35 may be composed of some series/parallel combination of linear and nonlinear elements such as semiconductor junctions and resistors; the purpose of the nonlinear gain control network being to provide the exponential correlation needed between the AGC signal and the gain control function of the RF pre-amplifier circuit.

While several techniques are known in the prior art for introducing an AGC signal into an RF amplifier, in the present circuitry it was found convenient to employ a PIN diode connected in series with the radio frequency signal path to perform both gain control and selecting one of the six band filters shown at 32; the PIN diode being held reversed biased to block signal entry to a band filter and being held forward biased with a varying amount of forward current to select the conductance or gain of the diode as a signal transmitting element. In the FIG. 1 system it was found desirable to employ one PIN diode at the input of each of the band filters 32 and to vary the forward current in this diode as a function of the automatic gain control voltage and to employ another PIN diode at the output of each of the tuned RF amplifiers 34 and to switch the latter of these diodes between the conducting and nonconducting state by way of digital signals received from the band enable circuitry 39.

In the preferred embodiment of the invention, it was found desirable to incorporate about 20 db of signal power gain into the RF pre-amplifier assembly. It was also found desirable to bias the tuned RF amplifiers 34 at an operating point providing best noise figure rather than maximum gain. With these operating conditions in the receiver front end, a sensitivity down to 1 microvolt at 30 percent modulation is achieved. The system is also capable of operating with up to 100,000 microvolts of input signal by way of the 60 db of automatic gain control provided, and likewise is capable of operating without damage when signals as large as 500,000 microvolts or ½ volt are applied.

Signals from the RF pre-amplifier assembly are applied to the high pass filter 38 which has an attenuation near 33 db at a frequency of 50 MHz and an attenuation of 3 db at 175 MHz. The high pass filter 38 is incorporated into the system in order that the receiver offers sufficient rejection to any 50 megacycle interference signal appearing at the antenna. Without the high pass filter 38, it was found that a 50 MHz interference signal could pass through the band filters and the double balanced mixer 40 into the tuned amplifier 52 with undesirable ease.

After transmission through the high pass filter 38, an incoming RF signal is applied to the double balanced diode mixer circuit 40 where the incoming RF signal and signal from the electrically tunable local oscillator 44 are mixed to provide signals at the first intermediate frequency of 50 MHz. Although the prior art in radio receiver design describes several circuits for mixing radio frequency signals, the double balanced diode mixer wherein a semiconductor diode bridge has a first center tapped coil connected across one axis of the bridge and a second center tapped coil connected across the other axis of the bridge, wherein the radio frequency input signal is applied at the first coil and the intermediate frequency output is taken from the second coil, and wherein the local oscillator signal is applied between the two coil center taps has been found to offer desirable economical mixing performance in a small package. The particular double balanced diode mixer employed in the preferred embodiment of the present invention provides a conversion loss of between 7 and 9 db with a noise figure in the 7 to 9 db range.

The tunable local oscillator in a superheterodyne receiver may take any one of several electrical forms including an oscillator tuned by mechanically varying the inductance or the capacitance elements of a resonant L-C circuit as is the arrangement found in most household AM and FM receivers, or a form of oscillator involving the use of plural quartz crystals in an arrangement permitting mechanical or electrical selection between different crystal units — this technique being especially popular in military and limited frequency communications equipment. Although any of the known local oscillator tuning schemes could be used in an ADF receiver built according to the present invention, the environment of the present receiver calling for signal reception anywhere within a fairly wide range of radio frequencies makes the frequency synthesizer form of local oscillator practical. In a frequency synthesizer local oscillator, the oscillating frequency is altered by changing the characteristics of the digital feedback network coupling output and input of a phase locked oscillator loop. The phase locked loop as used in the frequency synthesizer is described in detail in many prior art publications, such as the article entitled, "The Monolithic Phased Locked Loop — A Versatile Building Block", by Allen B. Grebene, of Signatics Corportion, and appearing in the March 1971 issue of the magazine "Spectrum" published by the Institute of Electrical and Electronic Engineers. An integrated circuit phase locked loop is commercially available on the market and frequency synthesizer local oscillators have been employed in communication equipment of the Citizens Band two-way radio type for some time.

In the circuitry of FIG. 1, the output of the electrically tunable local oscillator (frequency synthesizer) is coupled through a broad band amplifier 42 into the double balanced diode mixer circuit 40. The broad band amplifier 42 provides isolation between the double balanced mixer and the frequency synthesizer local oscillator circuit. The output of the mixer circuit 40 is coupled into a 50 MHz double tuned amplifier 52 which may be designated as the first of several intermediate frequency amplifiers. The output of amplifier 52 is coupled into the second double balanced diode mixer circuit 54 along with the output of the second local oscillator 56 which is operated at a frequency of 60.7 MHz and is frequency stabilized by a quartz crystal. The employment of two mixer stages and two local oscillators, that is, the use of a double conversion front end in the FIG. 1 system was found desirable in reducing the image response of the receiver. The second double balanced diode mixer 54 can be identical with the first double balanced diode mixer 40.

Broad band Class A intermediate frequency amplifiers which are capable of being gain controlled over a large dynamic range are used in the FIG. 1 circuitry. With borad band intermediate frequency amplifiers, the needed frequency selectivity is vested in a crystal filter circuit that precedes the Class A amplifier circuit, this arrangement being shown at 58, 60 and 62 (FIG. 1B) where the signal from the double balanced diode mixer 54 is fed through the quattz crystal filter 58 into the Class A amplifier circuits 60 and 62. A quartz crystal filter having 3 db half power points of 35 KHz — that is, a filter having a center frequency of 10.7 MHz and a total 3 db band pass of 35 KHz centered on the 10.7 MHz IF frequency, is quite satisfactory. Such a crystal filter also has a 60 db band width of 100 KHz or less with a 6 db maximum insertion loss. The fixed gain broad band Class A intermediate frequency amplifier 60 is vested with a signal power gain of 30 db while the variable gain broad band Class A IF amplifier 62 is vested with a gain controllable between −10 db and +30 db depending upon the applied AGC signal.

Signal at the output of variable gain amplifier 62 is a 10.7 MHz radio frequency carrier which may be modulated by an audio signal, a pulse signal and a 10 Hz sinusoid resulting from rotation of the directional antenna 20 at a 600 RPM rate. The signal from variable gain amplifier 62 is applied to both variable gain amplifier 64 and variable gain amplifier 66, the amplifier 64 providing signal to the audio frequency envelope detector 68, while the amplifier 66 provides output signal for the binary or pulse circuitry of the system and signal for the automatic gain control system. The variable gain amplifier 64 is again a Class A amplifier capable of providing gain in the range of −10 db to +20 db according to the amount of gain controlling signal supplied by the fast AGC amplifier 70. The fast AGC amplifier 70 provides an output signal between 4 volts and 10 volts according to the magnitude of the signal received from the output of envelope detector 68, such AGC amplifier 70 having the characteristics of both rapid rise and rapid fall of its output signal in response to the output of envelope detector 68. The primary function of the fast AGC amplifier 70 is to remove a large portion of the 10 Hz modulation imposed by the rotating directional antenna 20 from the audio signal component of the RF signal received from the variable gain amplifier 62. The overall effectiveness of the combined fast AGC amplifier 70 and the slow AGC amplifier 72 may be measured in the fact that signal at the output of envelope detector 68 does not fall outside the range of 100 to 200 millivolts even though the input signal at antenna 20 varies from 1 to 100,000 microvolts.

The 100 to 200 millivolt audio signal at the output of envelope detector 68 is applied to the narrow band audio amplifier 78 where signals suitable for driving an aircraft intercommunication system are developed, these signals appearing at terminal 82 (FIG. 1B). The narrow band audio frequency amplifier 78 is provided with a manually adjustable loudness control 80. The band pass of the audio frequency amplifier 78 is limited to the range of 500 Hz to 3,000 Hz at the 3 db down points, with the roll off below 500 Hz being 24 db per octave and the roll off above 3,000 Hz being 6 db per octave in order that signal modulation components outside the voice communications range be removed and not clutter the audio frequency signal.

Signal from the variable gain amplifier 62 is also applied to the variable gain amplifier 66 and thence to the two envelope detectors 74 and 76, which remove the radio frequency carrier and provide output signals representing the modulation component of the RF signal and the peak magnitude of the RF signal respectively. Signal from the envelope detector 74 is applied to the low pass filter network 84 and thence to the decision threshold network 86. The low pass filter network 84 is incorporated into the system primarily to remove from the signal the component of modulation resulting from rotation of propellers on some aircraft used to house the ADF system. Without the low pass filter 84 included in the circuitry, it was found that signals originating from a point behind the aircraft were processed with greater stability than were signals arriving from the frontal side of the aircraft where modulation by the propellers was encountered. The low pass filter network 84 has a pass band between the frequencies of 10 Hz and 65 Hz and an attenuation near 60 db at frequencies of 90 Hz and above.

Signals originating in the commonly used frequency sweeping chopper modulated emergency rescue beacon transmitter contain a modulation component varying between about 240 and 3,000 Hz at a rate near to 3 Hz, this modulation component providing a distinctive "woop-woop" sound that is easily identified in rescue operations. Since such woop-woop modulation component would unnecessarily complicate the signal peak detecting function, the low pass filter 84 removes this modulation from the signal and provide an output indicating merely the presence or absence of a radio frequency signal. Signal applied to the low pass filter 84 is in the order of 1½ volts peak-to-peak, with a 6 db variation resulting from 100 db input changes at antenna 30.

Signal originating in envelope detector 76 represents the peak amplitude of the radio frequency signal and is applied to the AGC signal generator and amplifier circuit 72. As shown in detail in a later part of this specification, the circuitry of the AGC signal generator and amplifier 72 includes a capacitor memory element havIng a long decay time constant near 5 seconds in duration. The circuitry of the AGC signal generator and amplifier 72 provides what is named a fast attack slow release AGC signal, i.e., a AGC signal capable of quickly following magnitude increases in the 10.7 MHz pulses received from envelope detector 76, but falling from this peak amplitude at a very slow rate. At selected times in the FIG. 1 system operation it is desirable to quickly remove the AGC signal that has been developed. This removal is accomplished by a signal supplied on line 73 which originates in decoding circuitry 120 (FIG. 1D) for the antenna revolutions counter.

The analog signal indicating presence or absence of a target radio frequency energy source as provided by the low pass filter 84 is applied to a threshold gate circuit 86 which removes low amplitude analog signals and transmits those analog signals which equal or exceed a preestablished threshold magnitude. The magnitude of signal required from the low pass filter 84 in order that an analog signal be passed through the threshold gate 86 is determined by the setting of sensitivity control 88, which is made accessible to the operator or alternately can be made a maintenance adjustment. Although the directional antenna 20 employed in the ADF system has its major response located in a single frontal lobe, the antenna inherently contains one or more minor response lobes directed to the sides and rear of the main response lobe. In the situation where a signal is received via the frontal lobe from a distant transmitter and from a nearby transmitter via the minor lobes it was found possible for the system to become confused through processing both the frontal and rearward lobe responses. For this reason threshold gate 86 was incorporated and greatly reduces the possibility of confusion by eliminating a large portion of the signals entering via minor antenna response lobes on the basis of their lower amplitude.

The presence of a signal from a target transmitter has been found to be reliably sensed in the present ADF system environment by detecting the peak of the approximately sinusoidal wave at the output of low pass filter 84, that is, by detecting the point of inflection or the point of zero slope in the low pass filter output. Detection of the peak of this wave is accomplished with the differentiator circuit 100 and the zero crossing amplifier 102 (FIG. 1C). These circuits perform the electrical equivalent of mathematically differentiating the low pass filter output signal in order that the peak of the wave from the filter 84 be marked by a change in signal polarity at the output of differentiator circuit 100; this change of signal polarity or crossing of zero voltage being sensed and amplified by the circuit 102 which provides an output pulse whenever the polarity of its input circuit changes. The combination of differentiator circuit 100 and zero crossing detector 102 may be embodied in any one of several ways which are known in the art, the operational amplifier embodiment of such circuits as shown in FIG. 6A of the drawings has a large dynamic operating range (near 5 db) and can therefore accept a much greater range of input signals than would a simple differentiator circuit based upon driving a switching transistor into and out of the conducting state.

The output of zero cross detector circuit 102 is applied to the pulse shaping circuit 104 where an output pulse of uniform time duration and uniform rise and fall times is generated. The output of the pulse shaping circuit 104 is given the name target data pulse or TD1 pulse and is identified with the number 106 (FIG. 1C). The pulse shaping circuit 104 may consist of a monostable multivibrator triggered by the signals generated in the zero cross detector 102. The target data pulse or TD1 pulse 106 represents the output of the radio frequency portion of the automatic direction finding system. The TD1 pulse appears whenever the rotating antenna 20 locates a remote transmitter and scans through the point of maximum alignment with the remote transmitter, that is the TD1 pulse occurs just following the point of maximum signal reception from the remote transmitter.

The circuitry in the lower half of FIG. 1 (1D, 1E and 1F) displays an indication of the antenna 20 rotational position at the instant a TD1 pulse occurs, and also displays an indication of the antenna's rotational position for each TD1 pulse generated by the system. Such circuitry in the lower half of FIG. 1 also provides storage for the signal indicating TD1 pulse location within a rotation of antenna 20; incorporation of which storage capability enables the system to display a steady and continuous indication of a remote transmitter location and also permits the system to require in one mode of operation that signals be received from the remote transmitter in two successive antenna rotations at the same, or nearly the same, location before a display indication is made.

The amplifiers 108 and 110 (FIG. 1D) are located physically in the package containing the drive motor-gear box assembly 26 and the antenna 30, and are located several feet from the main portion of the ADF system. The amplifiers 108 and 110 amplify and sharpen the waveform of the rounded bipolar pulses originating in the magnetic pick-up heads 28 and 30 and convert these signals into a differential voltage suitable for transmission over the several feet of balanced twisted pair of conductors connecting the amplifiers 108 and 110 with the circuitry of blocks 112 and 114. The circuitry of the blocks 112 and 114 includes a balanced differential line receiver, a noise rejecting threshold circuit and also circuitry for converting signals from amplifiers 108 and 110 into digital pulses of uniform amplitude.

In a radio frequency receiver system which employs both a scanning antenna and an automatic gain control apparatus, some housekeeping rules are needed regarding the manner in which the automatic gain control apparatus responds to signals of different strength received at different times in the antenna's scanning pattern; for instance, if the antenna encounters a very strong signal located at the zero degree scanning position, and a very weak signal located at the 90° scanning position, it is possible for the housekeeping rules to dictate that the automatic gain control system first accommodate the receiver to the very strong zero degree signal and then immediately re-accommodate the receiver, by an increase of gain, to the very weak 90° signal. In the presently described ADF system, it was found that attempting multiple compensation of the receiver gain within a single antenna revolution leads to erratic information display requiring an undue amount of operator interpretation. A particularly troublesome form of this erratic response is found in the situation where the automatic gain control system has accommodated the receiver to a very weak signal at one azimuth position whereupon the antenna encounters a very strong signal at some successive azimuth position. Since the receiver system is adjusted for a high gain condition by the very weak signal, the encountering of a very strong signal will produce receiver overloading and generation of very long duration target pulses which will be displayed as a target located over a very wide band of azimuth positions. In the ADF system of FIG. 1, an elementary set of housekeeping rules for the AGC system is shown mechanized, these rules involving simply the requirement that the AGC signal generator and amplifier 72 provide an AGC signal corresponding to the strongest signal encountered by the antenna 20 during preliminary revolutions which precede the actual receiving and processing of radio frequency signals. With these rules, part of the antenna revolutions in a sequence are used only for the purpose of adjusting the AGC system, with the remaining portion being used for the reception of target signals. Since the operator of the FIG. 1 system is provided with frequency selecting controls, it is possible for him to exclude, from even the AGC system of the receiver, signals which are located on any particular frequency even though these signals be very strong in comparison with an elected signal — that is, reception of a weak signal on one frequency need not be jeopardized by the occurrence of a very strong signal on some other receiver frequency.

The ADF system shown in FIG. 1 is provided with two different modes of operation. One of these modes, which is called the single frequency mode, involves the receiver being tuned to a single reception frequency. This frequency, for instance, might be the internationally assigned distress frequency of 243 MHz. In the other mode of operation, called the all frequency mode, the system of FIG. 1 sequentially switches the receiver tuning between two, three or four different frequencies, each selectable by the operator. The single frequency mode of operation is intended for use in tracking or traveling toward one particular target transmitter while the all frequency mode is intended for searching a geographic area to find the approximate location of each one of several transmitting targets. In either the single frequency or the all frequency mode of operation, the principle of using preliminary antenna revolutions for the derivation of a suitable AGC signal and later revolutions for the actual reception of target data signals is adhered to.

In the all frequency mode of operation, the time required for the electrically tunable local oscillator (frequency synthesizer 44) to switch between frequencies and become stabilized at a new frequency has been found to be on the order of 20 milliseconds, since the antenna 20 requires approximately 100 milliseconds for a complete revolution it was found necessary to devote two preliminary revolutions of the antenna to the establishment of an AGC signal in order that at least one complete rotation occur after the receiver is actually tuned to a reception frequency.

The antenna revolutions counter 115, and its decoding logic 120 in FIG. 1D, control the receiver frequency changes, discharge times for the automatic gain control signal generator amplifier 72, the routing of target data pulses 106 into the display, memory and lamp circuits 172 and 174, and the correlation of presently received data with previously received data. The antenna revolutions counter 115 is a conventional four bit "ripple down" counter capable of 16 different output states, four of these states being devoted to signal processing in each of the four possible reception frequencies when the receiver is operated in the all frequency mode. In all frequency mode operation, the first four counts of the antenna revolutions counter 115 are devoted to signal reception on one frequency with part of the first one of these four counts being devoted to both achieving lock-on of the frequency synthesizer circuit 44 and to signal sampling for the AGC generator and amplifier 72, and with the second of the four counts being devoted entirely to signal sampling by the AGC signal generator and amplifier circuit 72 and with the third and fourth of these four counts being devoted to actual collection of target data signals. Commencing with the fifth count of the antenna revolutions counter 115, the receiver will be tuned to a new reception frequency wherein the four count sequence is repeated, in a similar manner commencing with the ninth and twelfth counts of the antenna revolutions counter, signals in the third and fourth reception frequency are processed, each for four counts of the counter 115.

The antenna revolutions counter 115 changes states once for each revolution of the antenna with the changes occurring upon receipt of the 1° antenna pulse from circuit 112 (FIG. 1D). In the all frequency mode of operation the antenna revolutions counter identifies sixteen consecutive revolutions of the antenna with each set of four of these revolutions being devoted to reception of signals in a different frequency band. In the single frequency mode of operation, the antenna revolutions counter 115 identifies only four antenna revolutions and the receiver is maintained in a single reception frequency so that at the completion of our antenna revolutions, a new set of four revolutions is commenced without changing the receiver frequency. The digital processing for the single frequency mode as shown in FIG. 1 incorporates the signal correlating circuit requiring a signal be located in the same or nearly the same position during two consecutive rotations of the antenna before display to the operator is made. Correlation is found to reduce the jitter or instability in target information displayed to the operator. In the FIG. 1 embodiment of the system, correlation capability is included only for the single frequency mode of operation because of the larger amount of digital memory required for correlating signals received during the sixteen antenna revolutions involved in the all mode of operation.

Looking to the FIG. 1 drawing makeup, the shift register 168 (FIG. 1E) may be fabricated with flip flops or magnetic devices or any of the other embodiments for shift register circuitry known to persons skilled in the art; with flip flops having been used in the preferred embodiment of the invention. The essential property of the shift register is that data be loaded in serial form into one end of the register and be transferred serially from bit to bit within the register in coincidence with a clock or shift pulse. In the case of shift register 168, data is loaded serially into same from the OR gate 160 while shift pulses are applied through the amplifier 166. Shift register 168 also provides an output signal which represents at any given time the input signal that was introduced 180 shift pulses earlier, that is, a particular bit of data from the OR gate 160 when introduced into the shift register 168 and shifted by 180 shift pulses will reappear at a later time on the output line 159. The shift register 168 is also provided with a clear signal which passes through amplifier 164 and has the capability of resetting all bits of the memory into the zero state.

The first two bits of the antenna revolutions counter 115, identified with the number 116 (FIG. 1D), count antenna revolutions in both operating modes of the system, with the output signals from these two bits identifying revolutions 1, 2, 3, and 4 of the antenna 20 in any operating mode. The switch 117, which is closed in the single frequency operating mode, disables the last two bits 118 of the counter 115 by holding the memory elements comprising these two bits in the true condition. With the two highest order bits of the counter held in the true condition, the logic circuitry of the system will perform any fifth, ninth, or thirteenth revolution function during revolution 1 of the antenna and will perform any second, sixth, tenth, or fourteenth revolution function during revolution 2 thereof.

The 16 different states which the four bit antenna revolutions counter 115 may attain are decoded by the electrical circuitry as shown in the block 120; for instance, the signal applied to AND gate 122 from the antenna revolutions counter decoding 120 is driven to the true state during any of the revolutions 3, 4, 7, 8, 11, 12, 15 or 16.

The TD1 pulse 106 representing target data reaches the target data latch 142 (FIG. 1E) and the 180 bit shift register 168 via one of two signal paths depending upon whether the system is operating in the all frequency mode without data correlation or in the single frequency mode with data correlation. In the all frequency mode the TD1 pulse is passed through AND gate 134 and OR gate 140 to reach the target data latch 142. Since the first memory elements of the shift register can receive target data only in the presence of a shift pulse, target data found within a 2° segment of antenna rotation is stored prior to a shift pulse in the target data latch 142. Target data from the target data latch 142 is coupled through the OR gate 160 into the first memory element of the shift register 168. As indicated by the signals coupled to AND gate 134, transmission of the TD1 pulse through the AND gate 134 requires that the antenna revolutions counter 115 be in a state indicating one of revolutions 3, 7, 11 or 15; that is, during each four revolution sequence of the antenna 20 in the all frequency mode, a single antenna revolution, being the third revolution, is devoted to filling of the 180 bit shift register 168 and data collected in the fourth antenna revolution is not used since target correlation is not performed in the all frequency mode.

When the system is in the single frequency mode of operation, that is, operating in the manner intended for tracking of a single target transmitter, the TD1 pulses enter the shift register 168 by a path different from that used for the all frequency mode. In the single frequency mode, the switch 131 is closed and the path for TD1 pulses involves AND gate 133, one shot multivibrator 136, AND gate 138, OR gate 140, target data latch 142, OR gate 160 and the shift register 168. In such mode, target data pulses which were loaded into the shift register 168 during the third antenna revolution emerge from the shift register on the signal line 159 at the same time that similar fourth revolution target pulses are being received in the form of TD1 pulses; however, since the shift register 168 stores target data for precisely one revolution of the antenna, the line 159 output of shift register 168 is third revolution target data and is coincident with the real time target data of the fourth antenna revolution.

Since in a practical environment, a given target may appear in slightly different rotational positions in the third and fourth antenna revolution, it is found desirable to include circuitry in the FIG. 1 system for electronically stretching the duration of pulses representing both third revolution targets and fourth revolution targets in order that such third and fourth revolution pulses be assured of simultaneous existence and the ability to enable AND gate 138. In the FIG. 1D circuitry, the third revolution target data which has been stored by shift register 168 is elongated by the one-shot multivibrator 144 which has a time period in the order of 1.8 milliseconds, i.e., target pulses from the 180 bit shift register 168 normally having a time duration near 0.55 millisecond are stretched into a pulse of 1.8 milliseconds duration by the one-shot multivibrator 144. In a similar manner, the TD1 pulse 106 is stretched by the one-shot multivibrator 136 into a pulse having time duration near 0.7 millisecond. When the elongated third revolution target pulse and the elongated fourth revolution target pulse overlap in revolutions 4, 8, 12 and 16, the conditions for AND gate 138 to pass signal are met and a target pulse, now a correlated target pulse, is passed between AND gate 138 and OR gate 140 and thence into target data latch 142, OR gate 160 and shift register 168.

The time duration of the one-shot multivibrators 144 and 136 is selected with a view toward the performance desired from the FIG. 1 system, the consideration in this selection being that the likelihood of coincidence between third revolution and fourth revolution targets increases as the duration of each of these one shots is made longer, however, this increased probability of correlation occurs at the expense of the system's ability to resolve closely spaced targets. That is, if the one-shot multivibrators 136 and 144 are made long in duration, the system will be unable to display targets which are located in closely adjacent rotational positions. By elongating both the previously received, or third revolution data in the one shot multivibrator 144 and the presently received or new data in the one-shot multivibrator 136, it is possible to realize correlation regardless of whether the fourth revolution pulse occurs slightly before or slightly after the third revolution pulse.

In the single frequency mode of operation, the correlation system provides a self clearing characteristic for shift register 168, i.e., it being not necessary to clear old third revolution target pulses from the shift register by use of the clear driver 164 because third revolution target pulses that are not substantiated or correlated by the presence of a similar target in the fourth revolution are automatically removed from storage by the lack of third, second, or fourth revolution correlation. Any third revolution target represented by a pulse from the one-shot multivibrator 144 which is not coincident with a fourth revolution pulse coming from the one-shot multivibrator 136 does not pass through the AND gate 138 and is therefore not replaced in storage in the shift register 168. As shown by that input of AND gate 138 originating in antenna revolutions counter decoding logic 120 (FIG. 1D), correlated signals are passed into the shift register 168 (FIG. 1E) during antenna revolutions 4, 8, 12 and 16. Since the upper two bits of the antenna revolutions counter 115 are disabled in the single frequency mode of operation, the AND gate 138 is enabled for every fourth revolution of the antenna and the designations of revolutions 8, 12 and 16 become without significance in single frequency operation.

Since the acceptance data by the shift register 168 and the erasing of data in the target data latch 142 are both initiated by the occurrence of a 2° antenna rotation pulse, the one-shot multivibrators 124 and 126 are incorporated into the FIG. 1 system to assure that resetting of the target data latch 142 occurs after the data has been received into the shift register 168. The one-shot multivibrator 124 has a time duration near 7 microseconds and thus delays the occurrence of the reset pulse for target data latch 142 by such time. The target data latch reset pulse is also made to be near 7 microseconds in length by the one-shot multivibrator 126.

In the all frequency mode of operation, the shift register 168 accumulates all the target data which is received during the third, seventh, eleventh and fifteenth revolutions of the antenna. Since the shift register 168 itself is only one antenna revolution in length, the data collected during any given revolution must be reinserted into the register several times (once for each revolution of the antenna wherein the shift register is active and shifting) in order that the shift register contains at the end of the data collecting cycle all of the data that is to be displayed. Re-entry of previously stored data into the shift register 168 is provided by AND gate 158 which is enabled by the switch 153 in the all frequency mode of operation.

Other embodiments of the automatic direction finder portion of the invention could include a shift register having more than 180 bits of storage capability. Storage capable of accommodating signals collected during each 2° segment of each of the sixteen antenna revolutions used in the all frequency mode could be incorporated into the system to make re-entry of stored data via AND gate 158 unnecessary; the incorporation of greater storage capability would also allow correlation of signals between antenna revolutions in the all frequency mode of operation in addition to correlation in the single frequency mode as described for the FIG. 1 system.

After the sixteenth antenna revolution in the all frequency mode of operation, or the fourth antenna revolution in the single frequency mode of operation, a complete array of targets has been accumulated in the 180 bit shift register 168, following which accumulation target display can be initiated. In the FIG. 1 system, target display is accomplished by activating the AND gate 170 (FIG. 1E) which is symbolic of a plurality of AND gates existing one in each of 180 data lines connecting the shift register 168 with the 180 bit flip flop memory 172. Depending upon the electrical circuitry employed in the 180 bit memory, the AND gate 170 can actually be incorporated as a part of the flip flop circuitry of the memory 172, that is, a memory flip flop can be made to assume either of its two states depending upon the signal existing on its two input lines during clock time. Circuitry which permits the memory flip flops to assume either the one or the zero state according to the condition of its two input lines also alleviates the need for a preliminary operation clearing the flip flop memory 172.

In the preferred embodiment of the invention, it was found possible to employ lamp filaments in the 180 lamp display 174 which provided adequate illumination while requiring a drive current that is within range of the individual flip flop circuits of the 180 bit memory and lamp driver circuit 172 and without the use of high current lamp driving circuitry. The precise lamp driving circuitry is described in detail in a later part of this specification.

Once target data has been transferred from the one hundred and eighty bit shift register 168 into the flip flop memory and lamp driver array 172, it is possible to clear the shift register in preparation for a succeeding cycle of target collection events. While such clearing could be accomplished in a serial manner by holding the shift register data input line from OR gate 160 at the zero or no signal value while shifting the register through 180 clock intervals (consuming one revolution of antenna time or approximately 100 milliseconds in the absence of some high frequency clock generator which could be applied to the shift pulse line), in the preferred embodiment of the invention it was found more convenient to clear the shift register by activating a parallel mode clear buss. Since each 4 revolution data collection sequence commences with two complete antenna revolutions which do not involve data storage in the shift register 168, these revolutions offer a convenient time for clearing the shift register target data which has already been transferred to the memory and lamp driver circuitry. As shown by the inputs to AND gate 145 (FIG. 1D), in the single frequency mode of operation shift register clearing occurs at the transition between antenna revolution 4 and antenna revolution 5, that is, when the pulse representing antenna revolution 4 falls, the one-shot multivibrator 148 is triggered and a pulse of substantially 7 microseconds duration is transmitted through the AND gate 156 and the clear pulse amplifier 164 into the 180 bit shift register. In a similar manner, in the all frequency mode of operation, transition between the pulse representing antenna revolution 6 and the pulse representing antenna revolution 7 passes a trigger signal through AND gate 143 and OR gate 147 into the one-shot multivibrator 148 to accomplish shift register 168 clearing.

A circuit embodiment for transferring information between the 180 bit shift register and the 180 bit flip flop memory and subsequently clearing the shift register all during the preliminary antenna revolutions devoted to establishing an AGC signal is shown in FIG. 1. In this circuitry, a pulse originating in OR gate 147 accomplishes both the transfer of information between shift register and memory and also initiates shift register clearing. The pulse generated by flip flop 152 is named the clear/write memory pulse in view of the operating mode wherein the contents of the shift register 168, regardless of their one or zero state, are impressed upon the bits of the flip flop memory array 172.

In both the shift register clear pulse and the clear/write memory pulse cases, logic signals are necessarily impressed upon a large number of circuits. In this regard, amplifiers 162 and 164 are employed to provide the current driving capability needed for these signal busses, which amplifiers 162 and 164 are presumed to be non-inverting in nature as indicated by the lack of a circle at their output terminal (FIG. 1E).

Since the signal from OR gate 147 initiates both the transfer of information from shift register to memory and also the clearing of information from the shift register, the possibility of a race condition wherein shift register clearing is accomplished before transfer completion exists. In practice, it is found that the circuit delay inherently involved in one-shot multivibrator 148 and AND gate 156 is sufficient to delay the clear pulse until data transfer between shift register and memory is completed.

The flip flop circuit 152 is incorporated into the shift register to memory transfer circuit in order that the shift register to memory information transfer may be related to the presence of target data rather than accomplished by some regularly occurring timing event. With the circuitry shown in FIG. 1, the flip flop memory 172 is allowed to display an array of target data (the most recently collected array) even though fading and poor signal reception conditions may have interrupted the arrival of signals from the target transmitter. When the system of FIG. 1 has received a group of target pulses and is displaying them on the lamp display 174, such display will not be interrupted until new target data has been received. Maintenance of old target data until replacement by newly received data is accomplished by setting flip flop 152 with data pulses (for OR gate 140) and resetting flip flop 152 to initiate the shift register to memory transfer of data, with the timing pulses from OR gate 147 being used for the resetting; that is, flip flop 152 is set by the presence of data and reset to transfer data at a time appropriate for shift register to memory transfer.

Since updating of the information displayed by memory 172 and lamps 174 in FIG. 1 requires the reception of new radio frequency data, the possibility exists that the system could become locked-up in a single output display if the signal producing the display is interrupted. This possiblity is circumvented by the incorporation of an automatic clearing circuit using the one-shot multivibrator 130 and the AND gate 132 (FIG. 1D). The multivibrator 130 is triggered by a 1° pulse, from circuit 112, that is, a pulse designating some particular revolution of the antenna. Following triggering of the one-shot multivibrator 130, the next occurring 2° pulse will accomplish an emergency or worse case setting of the flip flop 152 and consequential clearing of the flip flop memory 172. The one-shot multivibrator 130 once it enters its unstable timed state excludes further reception of one degree pulses from its triggering input by means of the AND gate 128. The AND gate 128 also requires that the system be in the single frequency mode of operation in order that the worst case circuitry be activated. The one-shot multivibrator 130 is given a long time duration, near 1,000 milliseconds or 10 antenna revolutions, in order that the worst case circuitry not operate frequently. With the circuitry shown, the multivibrator 130 will accomplish a worse case setting of flip flop 152 periodically even though normal setting is being accomplished by the signals received form OR gate 140. This property of the one-shot multivibrator 130 may of course be altered by the incorporation of additional signal inputs into AND gate 128 to permit setting of the flip flop only in the event normal signals are absent.

The signals applied to the clear pulse amplifier 164 include signals representing the all frequency mode of operation at two places of their generation, the switch 155 limiting application of shift register clear pulses to the all frequency mode of operation and the switch 141 determining whether the pulses from OR gate 147 occur following antenna revolution 4 or antenna revolution 6.

Since the operator of the FIG. 1 automatic direction finder system is provided with capability for excluding targets found on 1; 2 or even 3 of the frequencies searched by the radio frequency portion of the system, it is desirable to alert the operator in some manner if targets are being received on the excluded frequencies. In the operator alerting circuit shown at 177 (FIG. 1F), signal from the target data latch 142 which is set each time a target is found is applied at the appropriate time for channel 1 signals, channel 2 signals, etc. to one of the one-shot multivibrators 178, 184, 188 or 190, each of these one-shot multivibrators having a time duration in the unstable state that is near 400 milliseconds and each being connected to a display alarm light 180, 186, 189 and 191. By means of the AND gates 176, 182, 185, 187, each of the alarm light one-shot multivibrators is allowed to receive pulses from the target data latch 142 only when the radio frequency portion of the receiver is receiving target data pulses in the frequency channel that is monitored by that particular alarm light, that is, the alarm light 186 designates the presence of radio frequency signals received during the time that is designated channel 2 and the AND gate 182 allows signals into the one-shot multivibrator 184 only when the receiver is in the channel 2 condition. The timing signals applied to AND gates 176, 182 etc. originate in the antenna revolutions counter 115 and designate the antenna revolutions corresponding to each reception channel, for instance, the signals applied to AND gate 176 are those generated during revolutions 1 through 4 in the all frequency mode while the signals applied to AND gate 182 are those representing revolutions 5 through 8 in such mode.

In the single frequency mode of operation, identification of revolutions 5 through 8, 9 through 12, 13 through 16 where the receiver would ordinarily be tuned to second, third or fourth frequencies is meaningless and is therefore excluded from the alarm light portion of the system by circuitry incorporated in the operator switching array shown symbolically at 193 (FIG. 1F). This switching prevents signals from passing through the AND gates of the 176, 182, 186, 189 group when the system is in the single frequency mode of operation. Since the target display 174 provides no indication as to the source of a particular target signal, the alarm lights are also useful in the all frequency mode in allowing the operator to deduce which of the four reception channels is providing a particular target signal to the system. The direct connection of signals from a one-shot multivibrator such as 178 to an alarm display lamp 180 is intended to be symbolic only since in an actual embodiment a current driving circuit between the one-shot circuit and the lamp filament may be necessary.

At 46, 48, 50 and 51 in the FIG. 1 system is shown an array of circuits which controls tuning of the radio frequency portion of the ADF system. In the preferred embodiment of the invention, the operator of the ADF system is provided with five thumb wheel switches for each of the four reception channels of the system, these thumb wheel switches allowing operator selection of the actual radio frequency to be received by the system, with the selection being restrained to frequencies in the 200 to 400 MHz band and being selectable with 50 KHz resolution. The operator frequency select switches are shown symbolically as the circuit block 48 in FIG. 1A with the arrow 49 indicating that a plurality of signal conductors connect the operator frequency select switches and the electronic commutating logic 46.

The electronic comutating logic 46 connects the proper set of operator frequency select switches to the band enable circuit 39 and to the electronically tunable local oscillator 44 at a selected interval of time. When the sysem of FIG. 1 is operating in the all frequency mode of reception, one set of five operator frequency select thumb wheel switches will be connected through the commutating logic to the band enable circuit 39 and to the electrically tunable local oscillator 44 during revolutions 1 through 4 of the antenna 20 while a different set of operator thumb wheel switches will be connected to these circuits during revolutions 5 through 8 of the antenna. Signals determining that the antenna is performing revolutions 1 through 4 or revolutions 5 through 8, etc. are supplied to the electronic commutating logic 46 through the signal path designated by the arrow 51, this arrow being intended to represent the presence of several conductors connecting the antenna revolutions counter decoding logic 120 with the electronic commutating logic 46. On the other hand, when the system of FIG. 1 is operating in the single frequency mode of reception, the electronic commutating logic is locked into a state that continuously enables one selected reception channel; the locking signal being provided by the single frequency mode switch 50.

The electronic commutating logic 46 must generate two different types of digital output signal each suitable for use in a different one of the frequency selective portions of the system. The signals supplied to the electrically tunable local oscillator 44 are signals which will select any 50 kilohertz frequency interval in the 200 to 400 MHz range tunable by the ADF system while the signals supplied to the band enable circuitry 39 are signals capable of selecting the proper one of six available band filters 32 and tuned RF amplifiers 34 compatible with the frequency selected by the local oscillator 44. Since the band filters 32 and tuned RF amplifiers 34 in the preferred embodiment of the invention can span a frequency band of up to 50 MHz and since the operator can select any one of many operating frequencies at 50 KHz intervals within this 50 MHz band, the electronic commutating logic 46 must provide up to 1,000 different electrical output signal combinations for each of the six band filters; that is, for each band enable output of the electronic commutating logic circuit 46, there must be up to 1,000 different outputs available for the electrically tunable local oscillator circuit 44.

Since the operator of the FIG. 1 system is provided with four channels in which signals may be received by the ADF receiver, and since the operator is given complete freedom in selecting the frequency to be received on each of these channels, it is possible to tune each of the four channels to the same frequency so that during each of the 16 antenna revolutions of the all frequency mode, the electronic commutating logic will be providing the same signals to the band enable and electrically tunable local oscillator circuits 39 and 44. While this is true, in the preferred embodiment of the invention only three of the receiver operating channels are tunable by the operator, with the fourth channel being tuned to some fixed frequency such as the 243 MHz frequency assigned by International agreement for distress and rescue signals.

Although the FIG. 1 makeup of the drawings represents a practical embodiment of an ADF system made according to the present invention, it provides a simplified functional view only of the system since much of the construction detail which would be known to persons skilled in the art of radio frequency receiver design and electronic logic design is omitted. In such FIG. 1 illustration for instance, an elementary form of logic involving AND gates and OR gates rather than the more popular NAND and NOR gates has been shown. Also, a person skilled in the art of electronic design might select any of the now popular families of logic circuitry such as TTL or RTL or MOS/LSI as embodiments for the circuitry of the system. Furthermore, the AND and OR gates of FIG. 1 are drawn with the assumption that the most positive signal level represents the true condition and the less positive signal represents a false condition. The logic circuitry of FIG. 1 is also drawn to illustrate the needed logical functions without regard for the frequently encountered rules requiring that a flip flop circuit be driven only by an AND gate or that the logic in a sequence be organized such that AND gates precede OR gates, etc. Such rules are dictated by the particular family of logic circuits employed in mechanizing the system.

Another simplification incorporated in the FIG. 1 illustration of the invention involves the switches which are labeled single frequency and all frequency. In actual practice, all of the signal points driven by the several single frequency mode switches, such as switches 50, 117, 155 and 141, could be driven by a common signal buss as could the circuit points driven by the all frequency mode switches. It is also possible for the single frequency and all frequency mode busses to be driven from the same source of signal with the signal that feeds the all frequency mode points being the inversion of the signal feeding the single frequency mode points, that is, the all frequency mode signals and the single frequency mode signals being electrically separated only by a logical inverter circuit.

In describing the FIG. 1 circuitry, the two pulses which convey information concerning the rotational position of the directional antenna 20 to the logic circuitry have been called the 2° pulse and a 1° pulse, respectively, it being understood that the 1° pulse occurs one time for each revolution of the antenna while the two degree pulse re-occurs for every 2° of antenna rotation. After some work with the preferred embodiment of the invention, it was found desirable to delay the one degree pulse by approximately one-third of an antenna revolution in order that signal delay introduced by the low pass filter circuit 84 be accommodated (the low pass filter circuit like most frequency selective networks inherently induces some phase delay into its transmitted signals). Since the phase delay introduced by the low pass filter 84 can be measured in terms of a fraction of a cycle at the filter's operating frequency, the actual delay introduced by the filter 84 into the TD1 pulse 106 may be in the order of one-third of the time required for a cycle of a ten Hertz wave or a delay in the order of 30 milliseconds. In order that the TD1 pulse from a particular antenna revolution not be presented to the logic circuitry of the ADF system after the logic has been reset by the 1° pulse of the next revolution, it was found desirable to delay the 1° antenna revolution pulse to a position near 135° of rotation; in this manner delayed TD1 pulses arising out of one antenna revolution can be processed by the logical circuitry of the system before the next 1° pulse occurs. A different amount of shifting for the 1° pulse may be necessary depending, of course, upon the phase delay characteristics of the filters used in the low pass filter circuit 84.

The embodiment of the ADF system of FIG. 1 shows the use of a single one hundred and eighty bit flip flop memory 172 and a single 180 lamp display 174. In some applications of the ADF system, it may be desirable to employ several 180 lamp displays, each having its own 180 bit flip flop memory, this especially true in the instance where the ADF system is mounted in an aircraft where one display would be used by the aircraft pilot and another display used in a different portion of the aircraft by an observer. Although a second display could be slave connected in a parallel signal manner to the 180 bit flip flop memory 172, such an arrangement would require at least 180 signal conductors between the master and slave display indicators. An alternate method of incorporating a second display into the FIG. 1 system involves using a separate 180 bit shift register for each display. With separate shift registers data may be coupled to the slave display in serial fashion using a single signal path in lieu of the 180 signal paths required for parallel feeding of a slaved display. With the use of multiple shift registers, it is also possible to improve upon the target correlation circuitry of the system by using both the original and the new shift registers to store information for correlation. Since the shift registers operate at electronic speeds a correlation system using multiple shift registers must necessarily include some consideration of signal delays in long interconnecting cables.

Bearing Indicator Device

FIGS. 2A and 2B of the drawings show a bearing indicator device which may be used in presenting signals collected by the ADF system of FIG. 1 in a manner easily comprehended by a system operator. The bearing indicator device illustrated provides a simple and convenient manner for transferring the time relationship between target data pulses and the 1° and 2° pulses of FIG. 1 into an easily comprehended visual pattern. This transfer from electrical timing relationship into a visual pattern is accomplished without the use of moving parts or delicate mechanisms as have been used in prior art direction finder system displays. The bearing indicator device of FIGS. 2A and 2B also provides capability for displaying multiple pieces of information in a parallel manner rather than in the serial manner which has heretofore been common in the output devices used with automatic direction finding systems. Although such bearing indicator device of FIGS. 2A and 2B is contemplated for use with the automatic direction finder system of FIG. 1, and is described in terms of the signals generated by the FIG. 1 system, it is clear that the bearing indicator device hereinafter described may be used for displaying other types of information in environments having no connection with aircraft or the automatic direction finding art. For instance, the indicator device of FIGS. 2A and 2B might be employed in a security system where a person is monitoring the state of several sensors located in a periphery around some central point.

In the preferred embodiment of the automatic direction finding system, the bearing indicator device of FIGS. 2A and 2B is designed to have a minimum resolution of 2° — that is, the 360° of arc surrounding the central point of the operator display is divided into 180 equal arc segments of 2° each, this 2° resolution being in agreement with the preferred embodiment version of the ADF system wherein the space surrounding the antenna 20 is divided into 2° increments. It is contemplated that in the FIG. 1 system environment the indicator of FIGS. 2A and 2B can be called upon to display at one time as many as six targets per signal reception channel, or a total of 24 targets. Theoretically the indicator of FIGS. 2A and 2B can display up to 90 targets with one non-illuminated filament being used to separate each two illuminated filaments in such a display.

In FIG. 2A there is shown an exploded view of the bearing indicator device showing the construction details of both the operator viewable display portion and also the general arrangement of electronic circuitry which controls such operator viewable display. As per FIG. 2A, the components of the bearing indicator device are mounted on a frame portion which includes a frontal mounting plate 220, a central shaft member 221 extending approximately the entire length of the bearing indicator device, and a rear support ring 224 which is connected to the central shaft member 221. The entire bearing indicator device is contained within a circular housing 218 and is electrically connected with a source of power and electrical signals by means of the connector 262. The device can be mounted in an instrument panel or in some operator viewable position by means of mounting holes 250 which may receive screws or the like in the conventional manner.

The electronic circuitry which comprises the shift register 168 in FIG. 1, the memory 172, and the driving amplifiers for these circuits, is mounted on rectangular printed circuit boards shown at 252 and 254 in FIG. 2A. These printed circuit boards are electrically interconnected to the source of signal and power by means of board connectors 255, which are mounted on a circular backboard 226 contained on the central shaft member 221 of the bearing indicator device.

Adjacent the front of the bearing indicator device, the 180 lamp filament array 246 is hidden from direct viewing by a circular translucent disc 230 which covers the lamp filaments when the bearing indicator device is assembled from the FIG. 2A exploded view. A graduated scale 240, which is calibrated in degrees of azimuth, is mounted on the circular translucent disc 230. Directly in front of the circular translucent disc 230 is mounted a circular disc 236 having an index mark 232 impressed thereon, and directly in front of this circular disc 236 is mounted a transparent window 234 made of glass or a similar material and serving the function of preventing dirt and foreign objects from entering the bearing indicator device. A frontal retaining ring 228 is mounted to cover the entire front of the mounting plate 220 and the circular translucent disc 230 and the intermediate components with a circular gasket 238 being placed between the retaining ring 228 and the transparent window 234 to provide for a seal and a cushion therebetween.

Also included on the frontal ring 228 (FIG. 2A) is a manual adjustment knob 260 which, by means of a shaft and pinion (not shown), engage with gear teeth 244 on the circular translucent disc 230. The manual adjustment knob 260 permits operator rotation of the circular translucent disc 230 and the graduated azimuth scale 240. The array of lamp filaments 246 in FIG. 2A is arranged in groups of 20 filaments with each group being mounted on an individual pie-shaped segment 242, there being nine of the pie-shaped segments and therefore 180 lamp filaments in the bearing indicator device. Each of the pie-shaped segments 242 is mounted on the frontal mounting plate 220 by means of a screw 248 with the lamp filaments 246 in each such segment 242 being connected with the electronic circuit boards 252 and 254 by means of an electrical cable 258 which terminates in a connector 256 that mates with a corresponding connector located on each of the printed circuit boards. Construction of the bearing indicator device in the manner shown permits replacement of a pie-shaped segment of lamp filaments simply by removing the screw 248, disconnecting the electrical connector 256, and withdrawing the pie-shaped segment 242 through the front of the frontal mounting plate 220.

FIG. 2B of the drawings shows an operator's view of the front of the bearing indicator device of FIG. 2A. Included in FIG. 2B is a pointer 212 used to highlight the zero degree reference point of the calibrated scale 240 and the index mark 232 of the circular disc 236 as seen by the operator. Also shown in FIG. 2B is an annular frontal region 204 which is translucent in nature, that is, has the capability to transmit light originating at the non-viewing side of the region 204 without transmitting a clear image of the lamp filaments 246 therebehind when they are in the deenergized state. In the lamp filament array 246 non-energized state, the translucent region 204 appears as a uniform frosted region and is given a red coloration.

In the preferred embodiment of the bearing indicator device, the 20 lamp filaments mounted on each pie-shaped segment of the array 246 are all contained within the same glass or quartz evacuated bulb. These 20 filaments may, in addition to being contained within a common envelope, also have one common electrical terminal so that the evacuated (or pressurized) bulb need only have 21 terminals passing through its wall. Also, in the preferred embodiment each of the filaments in the group of 20 is designed to operate with 5 volts impressed across its terminals and with a current in the region of 10 to 14 milliamperes flowing; at this voltage and current the filament is designed to operate at a relatively cool temperature and produce a light output rich in the red and yellow color frequencies but also producing filament operating life near 50,000 hours. The reddish coloration given to the translucent annular region 204 of the bearing indicator device is compatible with the red and yellow spectrum components of the cool operating temperature of the lamp filaments. As shown in FIG. 2A, the individual lamp filaments of the array 246 are placed in a radial orientation with each filament having a length of approximately one quarter inch and with two adjacent filaments separated by the boundary between two pie-shaped segments 242 being separated by no more than 3° in lieu of the nominal 2° spacing which prevails for the remainder of the 20 lamp filaments. In the preferred embodiment of the bearing indicator device, the 20 filament glass bulb assembly is mounted by potting on a pie-shaped segment made from black phenolic material.

In operation of the bearing indicator device, a target signal is displayed to the operator in the form of a bright radially oriented glow being indicated on the translucent background 204, such indications being represented by the marks at 200, 202 and 206 in FIG. 2B.

When the bearing indicator device shown in FIGS. 2A and 2B is used with the automatic direction finding system of FIG. 1, the operator adjustable positioning through knob 260 of the circular translucent disc 230 and the graduated scale 240 permits displacement of the 0° point of such scale 240 from its illustrated alignment with the index mark or heading point 232 of the disc 230 in order that the heading point 232 may indicate the actual course being travelled by the aircraft containing the ADF system, and in order that the bearing of the target signals from the mounting aircraft be expressed in degrees relative to true magnetic north, operator adjustment of the circular translucent disc 230 also permits insertion of a crab angle into the bearing indicator device in order that a target being approached by the ADF aircraft may appear at the 0° point of the bearing indicator device. An approximate indication of the distance between the ADF aircraft and the target transmitter could be displayed by the bearing indicator device if the illumination intensity of the 180 lamp filaments is made a function of the strength of the target signal processed by the radio frequency portion of the ADF system, that is, if the illumination intensity of a lamp filament in the bearing indicator device of FIGS. 2A and 2B is made a function of the automatic gain control signal developed in the circuitry 72 of FIG. 1. Measurement of distance between a target transmitter and the receiving apparatus by measuring the strength of the HGC signal and the received radio frequency signal can only give an approximate indication of distance since the radiation power and radiation efficiency of the target transmitters and other variables must be assumed constant and equal for all targets.

Figure 3:
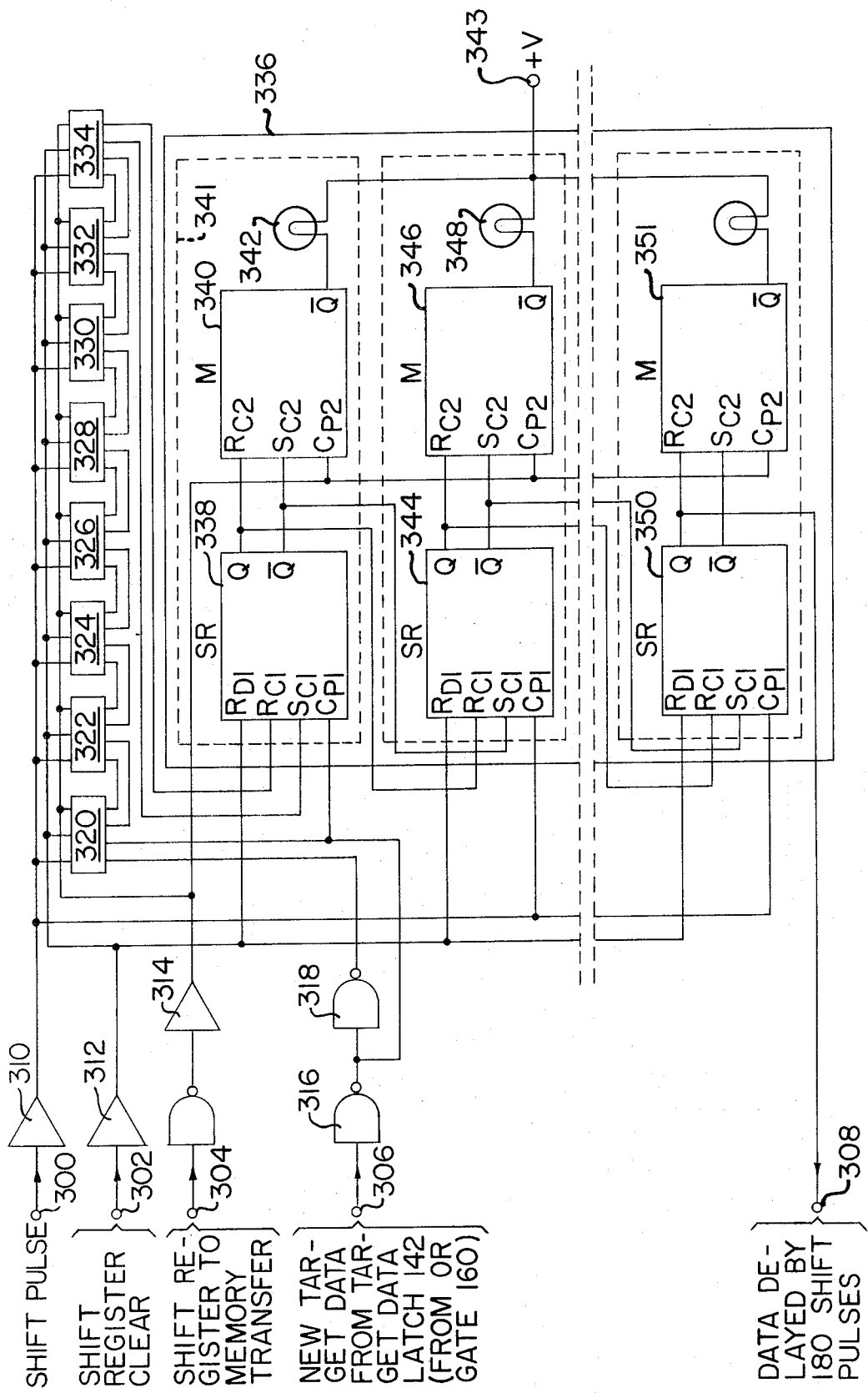
FIG. 3 of the drawings shows an electrical block diagram of circuitry employed in mechanizing the bearing indicator shown in FIG. 2.

In FIG. 3 of the drawings there is shown a schematic and block diagram of the electrical circuitry employed in the bearing indicator device of FIGS. 2A and 2B. Part of the circuitry of FIG. 3 is the same as that shown in FIG. 1 of the drawings, with additional detail of the circuitry employed in the shift register 168, the flip flop memory, and the lamp driver assembly 172 being shown in FIG. 3. In the earlier description of the ADF system, the 180 bit shift register 168 and the 180 bit flip flop memory 172 were shown as blocks without any description of the circuitry employed in fabricating either of these functions. In the FIG. 3 drawing there is shown one manner in which the shift register function and the memory function may be fabricated from conveniently available integrated circuit flat packs. As shown at 336, 20 of the 180 shift register bits together with 20 of the 180 memory bits are packaged on a single printed circuit board and are connected to 20 indicator lamp filaments. A total of nine such printed circuit boards are indicated by the numbers 320, 322, 324, 326, 328, 330, 332, 334 and 336 in FIG. 3; each of these boards being shown symbolically as a block with the exception of the board identified as 336 which shows in detail the flip flop circuits making up the shift register 168 and the flip flop circuits making up the memory 172. On the printed circuit boards 336, the flip flop 338 is the one hundred and sixty first of the 180 flip flops which are interconnected to form the 180 bit shift register 168 in FIG. 1. The circuitry for the flip flop 338 including the interconnections with the preceding printed circuit board 334 and the memory flip flop 340 and the next following shift register flip flop 344 is typical of the interconnections employed on each of the printed circuit boards 320 through 336.

The signal input and output terminals of the shift register flip flop 338 include $R_{C1}$ and $S_{C1}$ which denote the reset and set inputs requiring a clock pulse to accomplish the resetting and setting acts; $R_{D1}$ for accomplishing the direct or non-clocked reset of the flip flop; $C_{P1}$ for receiving the clock input pulse; and the conventional Q and $\overline{Q}$ output terminals. The terminals of memory flip flop 340 include clocked reset and set inputs $R_{C2}$ and $S_{C2}$ respectively, a clock pulse $C_{P2}$ which serves as the shift register to memory transfer gate and an output terminal $\overline{Q}$. As indicated by the numeral 341, the two flip flops 338 and 340 are contained within a single integrated circuit flat pack package used in the preferred embodiment of the invention.

In operating the flip flops 338 and 340, the shift register flip flop 338 is placed in either the set or reset condition according to whether the $S_{C1}$ or the $R_{C1}$ input is held true during the transition of the clock pulse $C_{P1}$. While the Q output of the flip flop 338 is in the true condition, that is while the flip flop 338 is set, the appearance of the clock pulse $C_{P2}$ at the input of the memory flip flop 340 causes the memory flip flop 340 to be placed in the reset condition wherein its $\overline{Q}$ output is in the true condition and current is allowed to flow from the power supply connected to terminal 343 through the indicator lamp 342. If during the next clock pulse $C_{P2}$ the $\overline{Q}$ output of flip flop 338 is in the true state, the flip flop 340 would be placed in the set condition and the $\overline{Q}$ output of flip flop 340 will be in the false condition so that indicator lamp 342 is extinguished. The transfer of information between the shift register flip flop 338 and the memory flip flop 340 requires the presence of the clock pulse $C_{P2}$, upon which $C_{P2}$ pulse appearing, the flip flop 340 can either be placed in the set or reset condition according to the output condition of the shift register flip flop 338. It is therefore apparent that the AND gate 170 shown in FIG. 1 is embodied in the FIG. 3 drawing as and AND function inherently included at the input of the memory flip flops 340, 346, etc. with the enabling signal for this and function being the $C_{P2}$ pulse in the nomenclature of the FIG. 1 system.

In addition to the data from the shift register flip flop 338 being transferred to the memory flip flop 340, this data is also transferred to the next succeeding shift register flip flop 344 upon the next appearance of the clock pulse $C_{P1}$ and in like fashion transferred to the remainder of the twenty flip flops on the printed circuit board 336 until a given data pulse has arrived at the last of the 180 shift register flip flops 350. The output signal of such last flip flop 350 is applied to terminal 308 and to the input of AND gates 146 and 158 in the FIG. 1 system, i.e., the output of flip flop 350 being the data originally placed in the 180 bit shift register after the data has been delayed by 180 shift pulses or by the time required for one complete revolution of the antenna 20. The output of flip flop 350 is also applied in the conventional manner to the inputs of the one hundred and eightieth memory flip flop 351. The signal which appears as the $C_{P1}$ pulse on each of the 180 shift register flip flops, such as flip flop 338, is received as the shift pulse from the FIG. 1 circuitry at terminal 300 of FIG. 3; this shift pulse being amplified by the amplifier 310 which provides a current and voltage output suitable for driving all of the one hundred and eighty shift register flip flop circuits. In a similar manner, the signal which performs the shift register clearing operation is applied at terminal 302 and is amplified by the amplifier 312 before application to the 180 shift register flip flops. The shift register to memory transfer pulse is applied to terminal 304 and amplified by the amplifier 314 before being applied to the 180 flip flops 340, 347, 351, etc. of the 180 bit memory. Target data from the OR gate 160 in FIG. 1 is applied at terminal 306 of the FIG. 3 circuitry and is inverted twice by the circuits 316 and 318 before application to the first shift register flip flop located on printed circuit board 320. Double inversion of the target data signal by the circuits 316 and 318 prevents the necessity of connecting the noise susceptible input of the first shift register flip flop of printed circuit board 320 to a long interconnecting line. Since the circuitry shown in FIG. 3 is included within the physical package of the bearing indicator device shown in FIGS. 2A and 2B, it may be desirable for the FIG. 3 circuitry to include power supply filtering of the type known in the art to provide freedom from noise introduced by the long interconnecting wires feeding the bearing indicator device.

Antenna System

In the preferred embodiment of the invention, the antenna 20 together with its associated drive apparatus and its associated magnetic pulse synchronizing system are located in a separate physical package from the main portion of the receiver apparatus, this separate package also including the RF pre-amplifier and band filter array shown at 32 and 34 in FIG. 1. In the preferred embodiment of the invention, the antenna apparatus is mounted in a pressurized container containing dry nitrogen at a pressure near 3 pounds per square inch for the exclusion of moisture, the top of which pressurized container is made from fiber-glass or other suitable non-metallic material capable of transmitting radio frequency energy without severe attenuation, and the bottom of which pressurized container includes a metal housing having the drive motor, the drive motor gearing, the synchronizing system and the RF preamplifiers mounted therein. Such drive motor, which is included in the drive motor and gear box assembly 26 of FIG. 1, is preferably a three phase induction motor which operates from 400 Hz aircraft power at a voltage of 115 volts, and is connected by suitable gearing to a central shaft on which the antenna array itself is mounted for continuous driving at a speed of near 600 revolutions per minute.

In the preferred embodiment of the invention, the synchronizing system which includes the magnetic pickup coils 28 and 30 for the respective 2° and 1° pulse allows for a pulse or minus 4° bore sight adjustment of the system in a mounting aircraft, that is, the location of the magnetic pickup coils 28 and 30 around the gears 24 and 25 of the antenna shaft is adjustable by plus or minus 4° in order that the system be aligned with the major axis of the aircraft.

Figure 4:
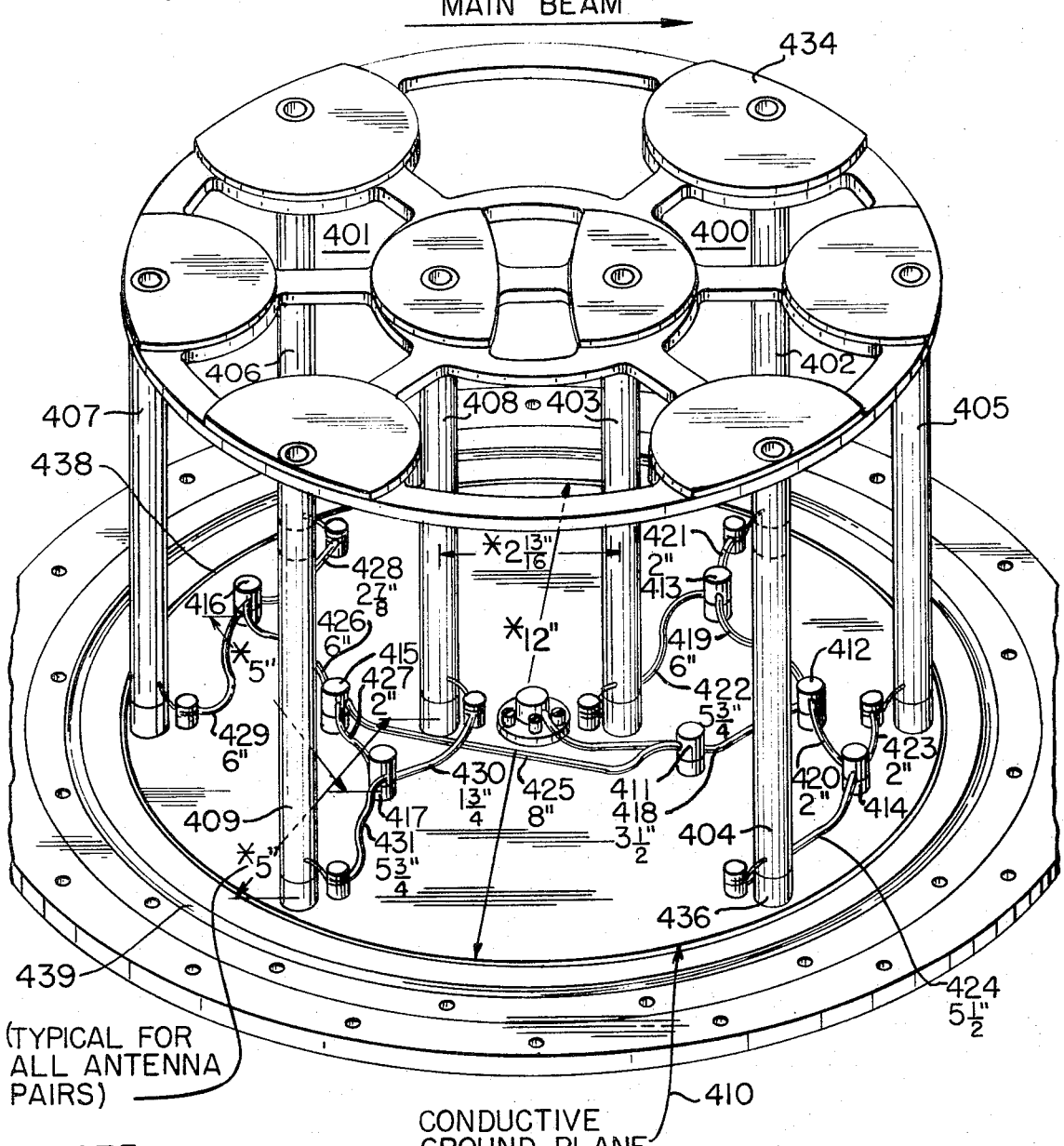
FIG. 4 shows an isometric view of a rotatable directive antenna used with the system of FIG. 1.

A practical embodiment of the antenna assembly 20 in FIG. 1 is shown in FIG. 4 of the drawings. It is intended that the antenna assembly of FIG. 4 be mounted through the top or bottom fuselage wall of an aircraft. The antenna array of FIG. 4 consists of eight one-eighth wave top loaded elements which are located according to a precisely spaced physical pattern and are electrically connected by coaxial cables providing precise signal phase delay. In the FIG. 4 antenna three multiplying cardioids of radiation are produced. The cardioids have an orientation of zero and plus and minus 67 ½° before multiplication. Elements of the FIG. 4 antenna array are mounted on a metal conductive ground plane 410 which is about 12 inches in diameter and which is capacitively coupled to the metal surface of the aircraft structure through a high capacitance rotating joint indicated at 438 in FIG. 4. The depressed ring 439 in the FIG. 4 antenna is used to retain an "0" ring which seals the joint between the conductive ground plane 410 and the nonmetallic antenna cover which is not shown in FIG. 4. The antenna elements and other components in FIG. 4 are symmetrically mounted in order that their physical rotation at 600 RPM be free of vibration. The radiating elements 402–409 in FIG. 4 are electrically coupled together by a network of hybrid transformers 411–417 and selected length coaxial cables 418–431. The coaxial cables 418–431 are connected to the individual radiating elements 402–409, through a resistance of 37 ohms which together with the approximately 12 ohms radiating resistance of the antenna elements provides the desired termination for the coaxial cable and the hybrid transformers. Impedance matching between the coaxial cables and the radiating elements of the FIG. 4 antenna amy alternately be accomplished with additional hybrid transformers to provide an increase in antenna gain and Q since the 6 db power loss in the 37 ohm resistances would be avoided. An antenna with increased gain and Q is found to be more sensitive to adjustment errors and to disturbance by nearby protrusions from the aircraft frame.

In FIG. 4, the dimensions which are not marked with the asterisks refer to coaxial cable length while the asterisk marked dimensions refer to physical location distances in the antenna array. A detailed method for designing the FIG. 4 antenna can be gained from the article *Directional Antennas* by G. H. Brown, which appeared in the *Proceedings of the Institute of Radio Engineers*, Volume 25, No. 1, Part 1, dated January 1937.

The antenna array of FIG. 4 provides a radiation pattern having a single major front lobe of approximately 60° width, the response being 3 DB down at points 30° either side of the major lobe center axis and 12 DB down at points 120° either side of the major lobe center axis. The FIG. 4 antenna provides a 15 db front to back ratio in the 225 to 285 MHz range and degrades somewhat about 285 MHz. The FIG. 4 antenna also provides a 3:1 Voltage Standing Wave Ratio and a gain of −15 DB to −18 DB as compared with an isotropic source of radio frequency energy.

FIG. 4, shows an elevation view of the antenna radiating elements 402 to 409 along with the top loading elements such as element 434. The top loading elements are fabricated from printed circuit board conductor in an arrangement wherein printed circuit board insulating material joins the tops of the radiating elements and the printed circuit conductor material is etched away except in the area needed to form the top-loading elements. In the FIG. 4 antenna, the radiating portion of the elements 402–409 has a length near 4½ inches and the individual elements are mounted on insulating members 436 which are in turn fastened to the conductive ground plane 410.

AGC System

In FIG. 5 of the drawings there is shown an electrical schematic diagram of circuitry which may be employed as the slow AGC signal generator and amplifier 72 in FIG. 1, the circuitry of FIG. 5 providing an AGC signal which is both gated as to commencing and termination times and also has a controlled signal rise time. Such circuitry essentially consists of a capacitor 502 for storing AGC signals, a switching array including one shot multivibrator 556 and transistor gate 558 for controlling the times of storage and discharge of the capacitor 502, and an amplifier including the transistors 506 and 547 and the operational amplifier 528 for developing a low impedance AGC signal from the signal stored in the capacitor 502 and the gating signals from the one shot multivibrator 556 and the transistor gate 558.

A demodulated 10.7 MHz carrier signal is applied at terminal 501 of the FIG. 5 circuit, which signal may be derived by passing the 10.7 MHz radio frequeny signal from an IF transformer winding through a series detector diode and a short time constant filter circuit. The signal applied at terminal 501 is a series of pulses occurring at a 10.7 MHz frequency rate and varying in amplitude according to the modulation of the carrier signal being received by the ADF system and also according to the rotation modulation resulting from scanning of the antenna 20. The signal at the temrinal 501 may also be modulated by propellers of the aircraft in which the ADF system is mounted.

The modulated pulses from terminal 501 are impressed upon capacitor 502 by way of the diode 500, the diode 500 serving to isolate the IF amplifier and terminal 501 from the storage capacitor 502 once a peak signal has been stored by the capacitor 502. The DC voltage appearing on capacitor 502, that is, the voltage representing the peak of the 10.7 MHz pulses appearing at terminal 501 is applied to a MOS field effect transistor 506 which is connected as a source follower circuit having a high input impedance. The output of the source follower stage is obtained from the potentiometer 408 and is applied to the non-inverting input of the operational amplifier 528.

From the earlier description of the ADF system, of FIG. 1, it will be recalled that in all modes of operation the system is tuned to a single radio frequency for a period of four antenna revolutions or 400 milliseconds. Signals identifying this 400 milliseconds of time are applied at terminal 554 of the FIG. 5 circuit, and such signal so applied changes from the True to the False state at the beginning of the 400 millisecond period and changes from the False to the True state when 200 of the 400 milliseconds have passed; it being therefore a signal having a 400 millisecond period and commencing with a transition from True to False. The signal applied to terminal 554 triggers the one-shot multivibrator 556 immediately upon transferring from the True to the False state, that is, at the beginning of the 400 milliseconds period. One shot multivibrator 556 provides a negative going output pulse to the logic gate 558 for a time near 3½ milliseconds, this 3½ millisecond pulse also being applied through diode 504 to the capacitor 502 in order that the capacitor 502 be discharged at the beginning of each 400 millisecond reception period immediately upon the receiver being placed in any given radio frequency. Such discharge occurs early in the two revolutions of the antenna which are devoted to collecting AGC signals.

The DC signal appearing on the capacitor 502, after a series of 10.7 MHz pulses, is amplified by the FET source follower transistor 506 and the operational amplifier 528 and the emitter follower circuit of transistor 547. Following this amplification, the signal from capacitor 502 is coupled to the output terminal 572 which is connected to the gain-controlling terminals of the radio frequency and intermediate frequency amplifiers in the FIG. 1 system. The signal at terminal 572 may vary between approximately +3.7 volts to place the receiver in the high gain condition and +10 volts to place the receiver in the low gain condition. Depending upon the AGC voltage needed in a particular RF amplifier stage, the signal from terminal 572 may be divided by resistor network or a network providing an offset voltage.

The circuitry shown at 559 in FIG. 5 provides an input signal to the operational amplifier 528 for generating an artificial signal which limits the speed with which the AGC signal at terminal 572 can rise, this limited rise having been found desirable in the operating condition where the receiver encounters a very strong radio frequency signal immediately after the capacitor 502 has been discharged by the one-shot multivibrator 556. Since discharging of the capacitor 502 places the receiver in the high gain condition, it is possible for a very strong radio frequency signal received during this high gain condition to develop an excessively large voltage across the capacitor 502; this excessively large voltage being developed by the processing of a very strong radio frequency signal through receiver amplifiers which are operating in their maximum gain condition rather than in a gain limited condition such as will exist when the proper AGC signal had been developed. With the receiver operating in the high gain condition, the voltage cross capacitor 502 tends to overshoot if some provision for preventing same is not included in the system. The circuitry at 559 in FIG. 5 prevents overshoot in the voltage developed across capacitor 502 by providing an artificial AGC signal which arbitrarily places the receiver in some medium gain condition for several milliseconds following the discharge of capacitor 502.

In the circuit at 559, a 3½ millisecond pulse originating in the one-shot multivibrator 556 is inverted by the transistor inverter circuit 558 into a positive pulse, that is, a pulse having a positive polarity for 3½ milliseconds. This positive pulse is applied through the diode 560 to the capacitor 564 and charges the capacitor 564 to approximately +5 volts, which is applied through diode 514 to the input of the operational amplifier 528 and therefore appears as a positive AGC signal at terminal 572. The positive signal on capacitor 564 has a full 5 volt magnitude for the duration of the discharge pulse from one-shot multivibrator 556 or for about 3½ milliseconds. Following this full amplitude period, the voltage across capacitor 564 decays slowly at a rate determined by the time constant of resistor 562 and capacitor 564, that is, the gain of the receiver is allowed to increase slowly as capacitor 564 is discharged. The discharge time constant of capacitor 564 is made about thirty three milliseconds in length so that substantially one revolution of the antenna 20, or 100 milliseconds of time elapses before the capacitor 564 has discharged to a negligibly small value of artificial AGC voltage. During the dischage of capacitor 564, any larger signal developed across capacitor 502 can overrule the signal supplied by capacitor 564 and thereby open the diode 514 and provide a normal AGC signal input to the operational amplifier 528. In the event the receiver does not encounter a radio frequency signal large enough to overrule the signal supplied by capacitor 564, during the first of the four revolutions, on a given frequency it is presumed that the receiver will not receive an excessively large signal during the second of the four revolutions and such signal as is received during the second revolution can be allowed to charge the capacitor 502 in the normal manner.

The register 566 and the zener diode 568 in FIG. 5 provide a minimum AGC voltage near +3.7 volts to the terminal 572, the voltage at 572 never being permitted to go less positive than +3.7 volts by means of the voltage developed at the junction of resistor 566 and zener diode 568. The voltage at the junction of resistor 566 and zener diode 568 is also used as a reference voltage for the FIG. 1 differential amplifier 33 which is located in the RF pre-amplifier package. The differential amplifier senses the difference between signal at terminal 572 and signal at terminal 576 in developing an AGC signal for the RF preamplifier; sensing of the difference between signal at terminal 572 and terminal 576 for the RF AGC signal being in accordance with the technique of using a differential amplifier that is non-responsive to common mode noise signals for signal transmission through an area of high electrical noise.

Several of the components in the FIG. 5 diagram accomplish functions which are well known in the art and require little description in the present specification, this being true for the resistors 510 and 512 which provide an operating bias point for the transistor 506; the resistor 518 and capacitor 516 which provide a filtered source of +5 volts for operating the transistor 506; the resistor 538 and the capacitor 540 which provide a source of filtered −15 volts for the operational amplifier 528; and the resistor 544 and the capacitor 542 which provide a source of filtered +15 volts for the operational amplifier 528. The resistor 534 and the capacitors 536 and 526 provide high frequency response roll off for the operational amplifier 528; the resistors 522 and 524 determine the voltage gain of the operational amplifier 528; the diode 532 limits the output of the operational amplifier 528 when the output signal reaches some large voltage; the resistor 530 limits the current flow from the operational amplifier 528 through the base emitter junction of the transistor 547 when the voltage from operational amplifier 528 is large; and the resistor 550 and the capacitor 548 provide filtered +15 volts to the transistor 547 and the resistor 546 provides a load resistor for the amplifying transistor 547.

The circuitry of FIG. 5 provides what is named a fast attack-slow release AGC signal, that is the signal developed by the circuitry rises very rapidly upon the receipt of a strong radio frequency signal and maintains whatever value is attained during this rise over a long period of time. The time constant for maintaining this signal is in the order of several minutes by way of the high input impedance realized with the field effect transistor 506, such transistor being the most significant load on capacitor 502. FIG. 5 circuitry also causes the radio frequency amplifier portion of the ADF system to be set to a gain value suitable for the strongest signal received during the first two of the four antenna revolutions devoted to reception on a given radio frequency. Since the circuitry is responsive to the strongest signal received during the preliminary two revolutions, it can also cause the receiver to be non-responsive to a very weak signal which is received in the same revolutions as a very strong signal. If, however, the strong and weak signals are located on different radio frequencies, and hence are received during different antenna revolutions, the system of FIG. 1 can overcome such masking of a weak signal by a strong signal since it responds separately to the signals received from each radio frequency. Using the AGC signal developed by the circutry of FIG. 5, the ADF system of FIG. 1 is capable of providing radio frequency signals to the envelope detector 74 which vary only 6 db in strength when signals varying over 100 db in strength are applied at the antenna 20.

Target Detector Circuitry

Figure 6B:
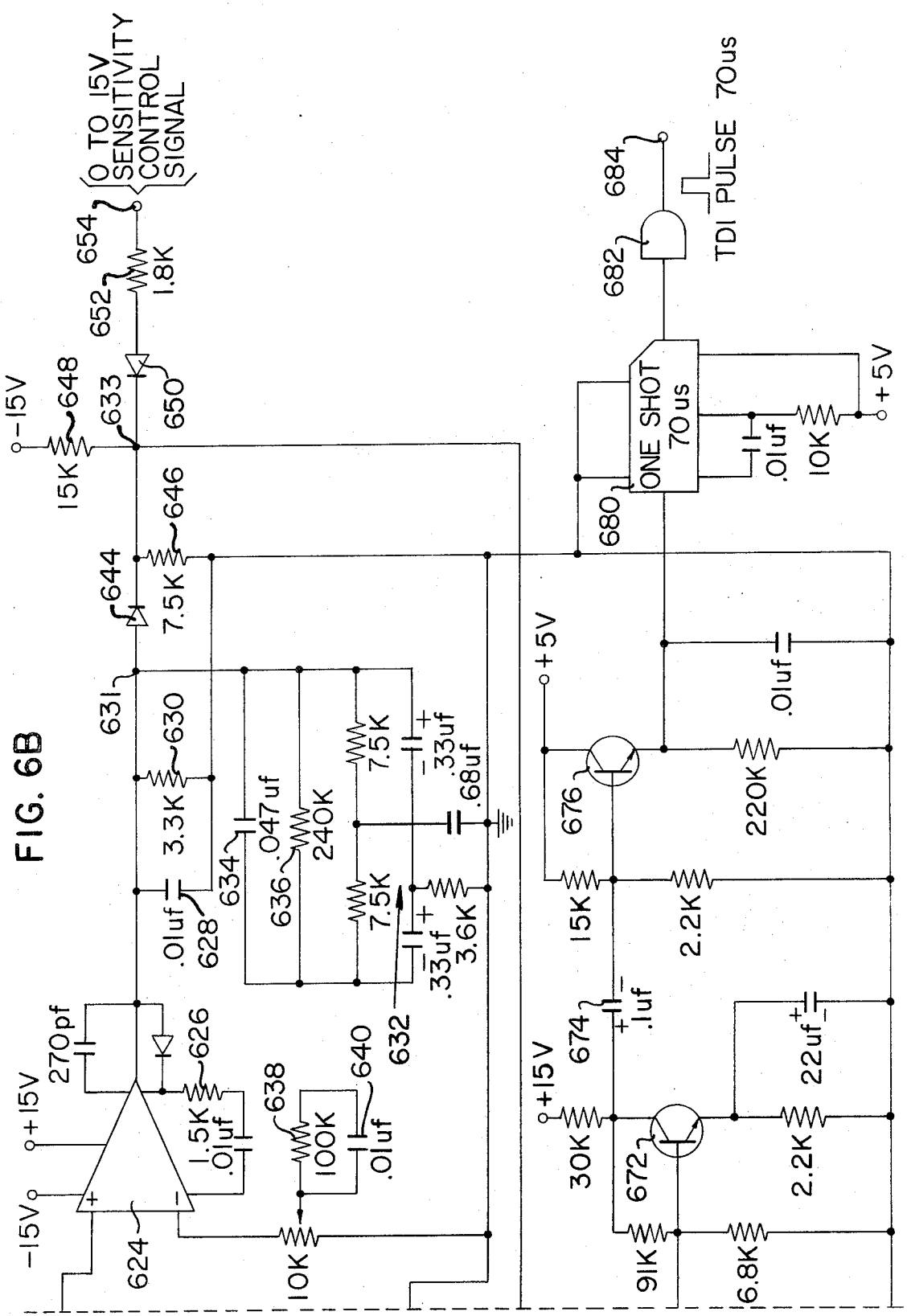

In FIGS. 6A and 6B of the drawings there is shown an electrical schematic diagram of one circuit arrangement which may be used to embody the circuitry shown as 84, 86, 100, 102, and 104 in FIGS. 1B and 1C, and the circuits which receive the 10.7 MHz carrier pulses from the intermediate frequency amplifier envelope detector 74 and develop from these 10.7 MHz pulses the target data pulse TD1 shown at 106 in FIG. 1C.

In the earlier description of the ADF system of FIG. 1 and the signals expected in operating such system, it was stated that the 10.7 MHz pulses applied at terminal 600 in FIG. 6A can be expected to have at least three components of modulation. The first of these components is a tone modulation impressed at the transmitter upon the emitted radio frequency carrier in order that the signal have a distinctive audio identification when processed by a receiver apparatus, this tone modulation usually having a frequency that sweeps between 240 and 3 KHz, for example, in one embodiment of the transmitter apparatus. The second of the modulation components expected in the signal at terminal 600 results from the propeller of the aircraft containing the ADF system interrupting the signal path between transmitter and antenna 20 at periodic intervals. The third of the modulation components expected in the signal at terminal 600 arises from rotation of the antenna 20 and the directional characteristics of this antenna, that is, a given target transmitter will be received with very high efficiency and very strong signals at one point during rotation of the anntena 20 while at other points this target transmitter will be received with very low efficiency. Since the antenna employed in the preferred embodiment of the invention has one major front lobe and two minor rear lobes in its response pattern, the signal received from a particular target transmitter via this antenna can be expected to have from the modulation imposed by the antenna 20 one burst of large amplitude pulses and two bursts of low amplitude pulses separated by times of very low amplitude pulses. The purpose of the circuitry in FIGS. 6A and 6B is to present a single digital output pulse at the time that signal at terminal 600 is being derived from the center of the major response lobe of the antenna 20 while ignoring all of the modulation components of the signal. Since the antenna 20 in FIG. 1 rotates with a period of 100 milliseconds, the desired peak amplitude bursts of 10.7 MHz signals appear at a rate of about ten cycles per second (10 Hz) at terminal 600.

Since all components of the signal at terminal 600 except the 10 Hz component are unnecessary and even undesirable in generating a TD1 target data pulse, a bandpass filter favoring the 10 Hz signal is incorporated into the FIGS. 6A and 6B circuitry. This bandpass filtering is accomplished in several stages in the circuitry, the components 602 and 604 in FIG. 6A for instance comprise an RC network connected in shunt with the signal appearing at terminal 600 while the components at 605 represent a three-section low pass RC filter; which filter includes the series resistance element 606 and the shunt capacitor element 608 followed by a second series resistance element 610 and a second shunt capacitance element 612 and a third series resistance element 614 and a third shunt capacitance element 616. Following the three-section low pass filter, the signal is passed through a band rejection filter 620 of the twin tee type having a null frequency near 100 Hz. Following the twin tee filter 620, the signal is applied to an operational amplifier 624 (FIG. 6B) having a modified twin tee filter and a high pass filter connected into the feedback path thereof. The twin tee filter included in the feedback path of operational amplifier 624 is shown at 632 and has a null frequency of 65 Hz. Placement of such a filter in the feedback path of an operational amplifier provides an increase in gain in the amplifier at the frequency of 65 Hz; this increase of gain having the effect of increasing the slope of the frequency versus attenuation curve of the overall band pass amplifier in the upper region of its band pass. The capacitor 634 and the resistor 636 modify the null characteristics of the twin tee network 632 by decreasing the sharpness of the 65 Hz null. The resistor 638 and capacitor 640 form a high pass filter which has the effect of lowering the gain of the operational amplifier at high audio frequencies.

The overall filter network including the low pass filter 605, the first twin tee network 620, and the operational amplifier 624 has a response curve which is substantially flat (within 2 db) from Dc up to 60 Hz with the response being down by 3 db at 65 Hz and with frequencies above 65 Hz being increasingly attenuated at the rate of 84 db per octave of frequency change.

The filter network between terminal 600 and terminal 631 is provided with a band pass which reaches considerably higher than the 10 Hz frequency produced when the rotating antenna 20 intercepts signals from a single target transmitter, this being in order that the ADF system be capable of processing signals received from two or more target transmitters which are located in close angular sequence during rotation of the antenna 20. For example, if the rotating antenna 20 encounters target signals in two azimuth locations separated by 20° of antenna rotation, the major lobe waveforms appearing at terminal 631 as a result of these two closely spaced target signals will have frequency components considerably above 10 Hz; the ability of the above-described filter network to pass frequencies up to 65 Hz reasonably accommodates this closely spaced multiple tartet condition.

To provide a single pulse identified with each sinusoid peak found at terminal 631 in FIG. 6B requires the elimination of signals resulting from the back lobe response of the directional antenna 20. Since these back lobe responses are some 15 db lower in amplitude than the front lobe responses, when the preferred embodiment antenna is used, a simple amplitude discrimination is found sufficient for removing these pulses. Amplitude discrimination is provided by the sensitivity control signal supplied at terminal 654 (FIG. 6B) and passed by resistance element 652 and diode 650 into the circuit node 633. The resistance element 652, the diode 650, the resistance element 646, the diode 644, and the signal at terminal 654 maintain the node 633 at some positive DC voltage between zero and +15 volts (as selected by the operator of the system or as selected by a maintenance type adjustment in the system) in order that a signal larger than this voltage be required at terminal 631 to produce an input for operational amplifier 662. That is, the pulse appearing at terminal 631 induces conduction in diode 644 if its amplitude is greater than the quiescent voltage established on node 633. When sinusoid peaks larger than the quiescent value on node 633 occur at terminal 631, they are AC coupled by the capacitor 656 and the resistor 658 into a high gain operational amplifier 662 which serves the function of a zero crossing detector, that is, capacitor 656 together with the low input impedance of operational amplifier 662 serve as a differentiating network which provides a signal of zero magnitude into operational amplifier 662 at the time when the sinusoid peak received from node 633 goes through an interval of zero slope change.

In operation of the FIGS. 62 and 6B circuitry, a sinusoid signal exceeding the quiescent voltage at node 633 causes the voltage at node 633 to rise, with current being supplied through the capacitor 656 and the resistor 658 into the summing node 657 of the operational amplifier 662. This current causes the output of the operational amplifier 662 to travel in a negative direction. Upon the sinusoid at node 633 reaching its peak or point of zero slope, the current flowing into summing node 657 will cease and the output of the operational amplifier 662 will return from the negative value toward a zero or positive going value. As the sinusoid from node 633 crosses the peak and begins to fall in amplitude, the current flowing into node 657 will reverse and the output of operational amplifier 662 will become positive. The change from negative going to positive going values at the output of operational amplifier 662 is AC coupled through capacitor 666 and diode 668 into the AC amplifier which includes transistors 672 and 676 and capacitors 670 and 674. The positive going pulse from operational amplifier 662 is inverted by the amplifier stage 672 so the output of the non-inverting amplifier 676 is a negative going pulse, this negative going pulse being suitable for triggering the one-shot multivibrator 680.

The output signal swing of operational amplifier 662 is limited by the two diodes incorporated in the network 664, the high resistance value in the network 664 providing the large gain for the operational amplifier 662. The capacitor 660 connected to the summing node of operational amplifier 662 removes high frequency signal components and noise which would be transmitted by the differentiating capacitor 656. Since the output of the one-shot multivibrator 680 is normally a negative going pulse for the time period of the one-shot, an inverter 682 is incorporated in the circuit to provide the positive going TD1 pulse having a duration near 70 microseconds as determined by the period of the one-shot multivibrator 680.

While the system and apparatus hereof accomplishes the objects and advantages mentioned, certain variations and especially variations departing from the 8 element passive monopole antenna array shown in FIG. 4 and variations which employ the charge of received signals occurring when the mounting aircraft is directly over the remote transmitter to improve the indication of target transmitter approach and passover for parcel drop and personnel location may occur to those skilled in the art and it is contemplated that all such variations not departing from the spirit and scope of the invention hereof are to be construed in accordance with the following claims.

What is claimed is:

1. Radio receiver and display apparatus for indicating signal receptions from and relative bearing location of a plurality of remotely located radio frequency signal emitting transmitters and for providing audio signal reception from said remotely located transmitters, said apparatus comprising:

substantially unidirectional antenna array having a continuously rotating field pattern capable of selectively receiving radio frequency signals in sequence from multiple directions of azimuth around the locus of said apparatus and capable of converting said received signals into antenna electrical signals;

selectively tunable superhetrodyne circuitry means including plural radio frequency amplifier stages coupled with first signal processing means for converting said antenna electrical signals into a radio frequency carrier strength indicating signal and also coupled with second signal processing means for converting said antenna electrical signals into a detected modulation envelope signal;

audio signal processing circuit means connected with said second signal processing means in said superhetrodyne circuitry means for generating from said detected modulation envelope signal an audible audio signal indicative of any audio frequency modulation imposed on the signal currently received from one of said remotely located transmitters;

gated automatic gain control circuit means connected with said selectively tunable superhetrodyne circuitry means for generating and storing during preliminary revolutions of said unidirectional antenna array field pattern a D.C. gain controlling signal correlated with the magnitude of said carrier strength indicating signal existing during reception of selected radio frequency signals by said apparatus and for applying said D.C. gain controlling signal to at least one of said plural radio frequency amplifier stages as a gain decreasing signal;

signal peak detecting means connected with said first signal processing means in said tunable superhetrodyne circuitry means for generating, during antenna field pattern revolutions other than said preliminary revolutions, binary pulse signals each timed in substantial coincidence with a peak value of said radio frequency carrier strength indicating signal, whereby each of said binary pulse signals identifies a maximum degree of alignment of said unidirectional antenna array field pattern with one of said remotely located transmitters;

signal storage and display means connected with said signal peak detecting means for accumulating said binary pulse signals during at least one revolution of said antenna array field pattern and for displaying to an operator a spatially oriented visual pattern representing said accumulated pulse signals.

2. Radio receiver and display apparatus as in claim 1 which also includes:

electrically controllable tuning means for changing the operating frequency of said selectively tunable superhetrodyne circuitry means and electrical control circuit means for coordinating revolutions of said substantially unidirectional antenna field pattern with changes of operating frequency of said selectively tunable superhetrodyne circuitry means and for identifying in said gated automatic gain control means said preliminary revolutions of said unidirectional antenna array field pattern.

3. Radio receiver and display apparatus as in claim 1 wherein said signal storage and display means also includes signal correlating means connected with said signal storage and display means and with said signal peak detecting means for presenting stored signals from said signal storage and display means in time coincidence with subsequent antenna field pattern revolution real-time binary pulse signals from said signal peak detecting means and for re-storing a correlated signal for each time a stored signal and a subsequent antenna field pattern revolution real time binary pulse signal occur in time coincidence.

4. Radio receiver and display apparatus as in claim 1 wherein said signal storage and display means includes digital memory means limited to storing the binary pulse signals generated during one revolution of said unidirectional antenna array field pattern.

5. Radio receiver and display apparatus as in claim 1 wherein said apparatus includes the combination of a substantially unidirectional antenna array having a directivity pattern incorporating one major frontal response lobe and at least one weaker minor response lobe angularly displaced from said major frontal lobe along with adjustable threshold circuitry means in said signal peak detecting means for amplitude distinguishing signals received via said major frontal lobe from signals received via said angularly displaced minor lobe.

6. Radio receiver and display apparatus as in claim 1 wherein said audio signal processing circuit means also includes fast automatic gain control circuit means for at least partially smoothing amplitude variations imposed upon the audio frequency component of signal received through said continuously rotating substantially unidirectional antenna array field pattern.

7. Radio receiver and display apparatus as in claim 1 wherein said gated automatic gain control circuit means also includes electrical circuit means for limiting the rate of increase of said generated and stored D.C. gain controlling signal during at least an early portion of said preliminary revolutions of said continuously rotating substantially unidirectional antenna array, field pattern, whereby signal received from a nearby transmitter is precluded from generating an excessively large overshoot in said D.C. gain controlling signal during said preliminary revolutions of said unidirectional antenna array field pattern while said receiver apparatus is operating in a high gain condition.

8. Radio receiver and display apparatus as in claim 1 wherein said first signal processing means in said selectively tunable superhetrodyne circuitry means also includes low pass electrical wave filter means for rejecting frequency components of said carrier strength indicating signal that are substantially higher in frequency than components generated when said continuously rotating substantially unidirectional antenna array field pattern sucessively aligns with two radio frequency signal emitting transmitters angularly separated by the minimum resolution capability of said continuously rotating substantially unidirectional antenna array field pattern.

9. Radio receiver and display apparatus as in claim 8 wherein said electrical wave filter means includes means for attenuating frequency components generated by multibladed aircraft propelling device interference with the signal path between said remotely located radio frequency signal emitting transmitter and said continuously rotating substantially unidirectional antenna array.

10. Radio receiver and display apparatus as in claim 1 wherein said continuously rotating substantially unidirectional antenna array and said selectively tunable superhetrodyne circuitry means are selected to operate in the ultra high frequency band of frequencies; and said gated automatic gain control circuit means includes means for generating during the first two of four consecutive revolutions of said antenna array field pattern a D.C. gain controlling signal amplitude correlated with the peak magnitude of said carrier strength indicating signal while receiving radio frequency signals on one frequency.

11. Radio receiver and display apparatus as in claim 1 wherein said substantially unidirectional antenna array has a directivity pattern incorporating a major frontal response lobe having a beam width near 60° when measured at the 3db down points.

12. Radio receiver and display apparatus as in claim 1 wherein said apparatus includes means for connecting said gated automatic gain control means with a sufficient number of said radio frequency amplifier stages to limit the signal variation at said signal peak detecting means of said apparatus to a value near 6db during an input signal variation of 100db.

13. A method for providing an aircraft with both homing guidance information and audio frequency communication information from a remotely located source of radio frequency energy so that said aircraft may be guided thereto comprising the steps of:

sequentially scanning with a directive antenna array the space surrounding said aircraft for signals originating at said remotely located source of radio frequency energy; thereby converting said signals into antenna electrical signals having a modulation component imposed by the scanning of said directive antenna array;

extracting from said antenna electrical signal an analog electrical signal corresponding to the antenna modulation component of said antenna electrical signals, said extracting involving amplifying and detecting said antenna electrical signals in radio receiver apparatus;

generating from said analog electrical signal a digital pulse signal timed substantially at the peak of said analog electrical signal, said act of generating including the acts of differentiating said analog electrical signal and initiating said digital pulse signal at the zero crossing point of the differentiated signal;

displaying agianst a background representing the incrementally divided scanning field of said directive antenna and the vector heading of said aircraft, a visual pattern representing time elapsed between antenna scan start and the occurrence of said digital pulse, whereby the operator of said aircraft is presented with a visual indication of the relative bearing between his own course of travel and the course of travel leading to said source of radio frequency energy;

whereby said analog electrical signal provides both homing guidance information and audio frequency communication information from said remotely located source of radio frequency energy by way of signal from said scanning directive antenna having a substantial average value incorporating the maximum response of said directive antenna array in lieu of the nulled or minimum response of said directive antenna array.

* * * * *